US012079301B2

(12) United States Patent
Garegrat et al.

(10) Patent No.: US 12,079,301 B2
(45) Date of Patent: Sep. 3, 2024

(54) PERFORMING TENSOR OPERATIONS USING A PROGRAMMABLE CONTROL ENGINE

(71) Applicant: Microsoft Technology Licensing, LLC, Redmond, WA (US)

(72) Inventors: Nitin Garegrat, San Jose, CA (US); Derek Gladding, Poughquag, NY (US); Shankar Narayan, Saratoga, CA (US); Sujatha Santhanaraman, Fremont, CA (US); Jayadev Velagandula, Santa Clara, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 870 days.

(21) Appl. No.: 17/145,244

(22) Filed: Jan. 8, 2021

(65) Prior Publication Data
US 2022/0222318 A1    Jul. 14, 2022

(51) Int. Cl.
*G06F 17/16* (2006.01)
(52) U.S. Cl.
CPC ................... *G06F 17/16* (2013.01)
(58) Field of Classification Search
CPC .... G06F 17/16; G06F 9/30007; G06F 9/3001; G06F 9/30036; G06F 7/5443; G06N 3/06; G06N 3/063
See application file for complete search history.

(56) References Cited

U.S. PATENT DOCUMENTS

| 5,404,448 A | 4/1995 | Bowen et al. |
| 5,898,893 A | 4/1999 | Alfke |
| 6,041,388 A | 3/2000 | Anumula et al. |

(Continued)

FOREIGN PATENT DOCUMENTS

| WO | 0237264 A2 | 5/2002 |
| WO | 2021000281 A1 | 1/2021 |

OTHER PUBLICATIONS

"FPGA Acceleration of Matrix Multiplication for Neural Networks", Retrieved from: https://www.xilinx.com/support/documentation/application_notes/xapp1332-neural-networks.pdf, Feb. 27, 2020, pp. 1-11.

(Continued)

*Primary Examiner* — Andrew Caldwell
*Assistant Examiner* — Carlo Waje
(74) *Attorney, Agent, or Firm* — Fountainhead Law Group, PC

(57) ABSTRACT

A command queue is configured to receive a command from a software application. A configuration storage is configured to store a plurality of configurations. A matrix multiplication unit is configured to perform matrix multiplication operations. Memory is configured to store matrices. A control engine is configured to retrieve the command from the command queue; retrieve a configuration from the configuration storage based on the command; generate, based on the command and the configuration, instructions for the matrix multiplication unit to perform a set of matrix multiplication operations on first and second matrices stored in the memory; send the instructions to the matrix multiplication unit to configure the matrix multiplication unit to output results of the set of matrix multiplication operations; and store the results in a third matrix in the memory.

20 Claims, 40 Drawing Sheets

(56) References Cited

U.S. PATENT DOCUMENTS

| | | | |
|---|---|---|---|
| 6,262,937 | B1 | 7/2001 | Arcoleo et al. |
| 7,453,720 | B2 | 11/2008 | Ju et al. |
| 8,947,937 | B1 | 2/2015 | Asnaashari |
| 9,542,119 | B2 | 1/2017 | Klein |
| 10,228,937 | B2 | 3/2019 | Werner et al. |
| 10,460,416 | B1 | 10/2019 | Sirasao et al. |
| 10,943,039 | B1* | 3/2021 | Sirasao .................. G06N 3/04 |
| 10,990,650 | B1* | 4/2021 | Vantrease ............... G06N 3/08 |
| 2018/0164394 | A1 | 6/2018 | Li et al. |
| 2018/0246669 | A1 | 8/2018 | Redfern et al. |
| 2018/0260690 | A1 | 9/2018 | Young et al. |
| 2019/0114499 | A1 | 4/2019 | Delaye et al. |
| 2019/0287582 | A1 | 9/2019 | Xu et al. |
| 2020/0175363 | A1* | 6/2020 | Lin ......................... G06N 3/08 |
| 2020/0183833 | A1 | 6/2020 | Sakharshete et al. |
| 2022/0122237 | A1* | 4/2022 | Yi ............................ G06T 5/30 |

OTHER PUBLICATIONS

Park, et al., "CENNA: Cost-Effective Neural Network Accelerator", In Journal of Electronics, vol. 9, Issue 1, Jan. 10, 2020, pp. 1-19.

Hu, et al., "On-Chip Instruction Generation for Cross-Layer CNN Accelerator on FPGA", In Proceedings of IEEE Computer Society Annual Symposium on VLSI, Jul. 15, 2019, pp. 7-12.

"International Search Report and Written Opinion Issued in PCT Application No. PCT/US2021/057559", Mailing Date: Feb. 24, 2022, 12 Pages.

\* cited by examiner

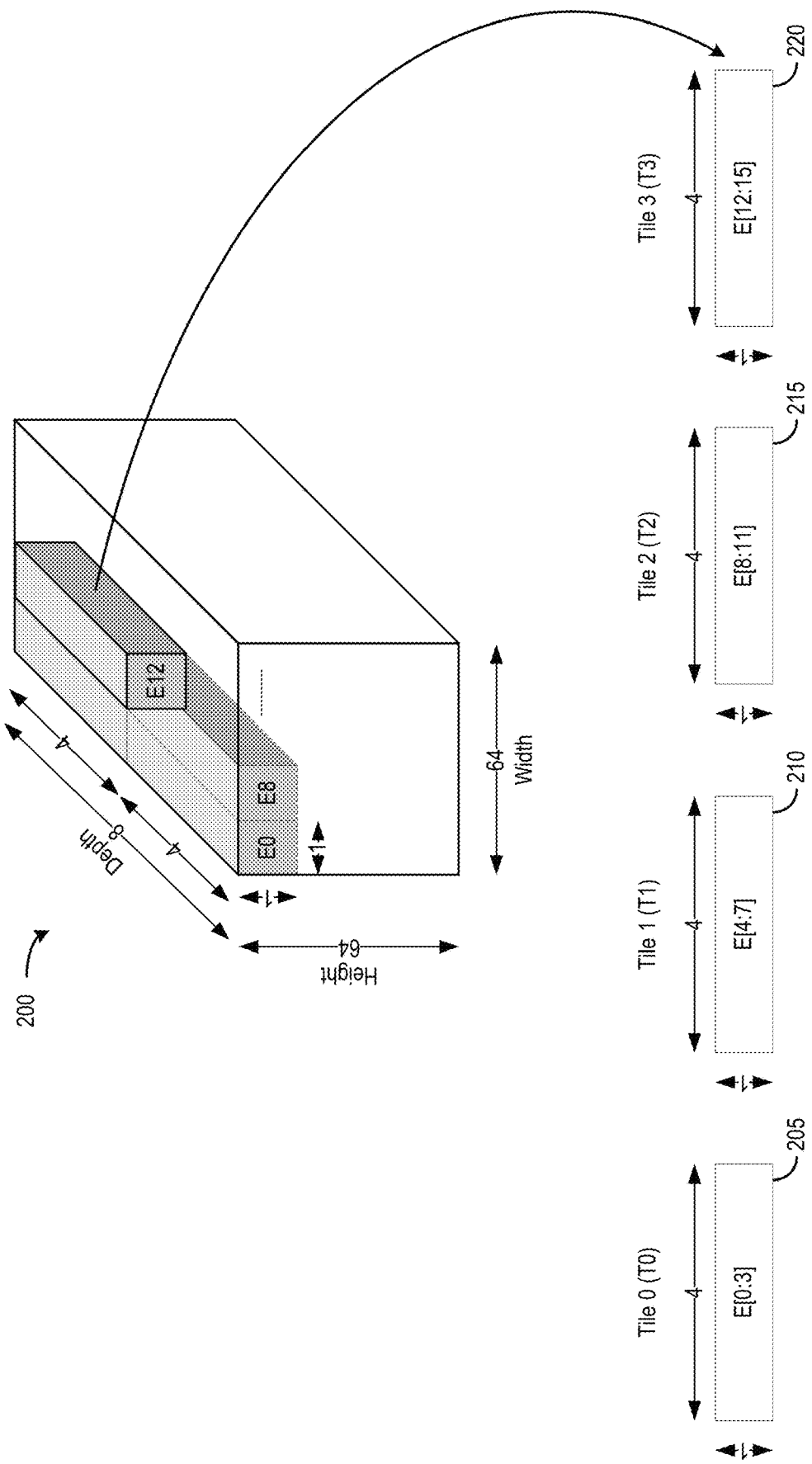

| | | |
|---|---|---|
| Tile 5 (T5) | E[20:23] | 412 |
| Tile 6 (T6) | E[24:27] | 414 |
| Tile 7 (T7) | E[28:31] | 416 |
| Tile 9 (T9) | E[36:39] | 420 |
| Tile 10 (T10) | E[40:43] | 422 |
| Tile 11 (T11) | E[44:47] | 424 |
| Tile 13 (T13) | E[52:55] | 428 |
| Tile 14 (T14) | E[56:59] | 430 |
| Tile 15 (T15) | E[60:63] | 432 |
| Tile 16 (T16) | F[0:3] | 434 |
| Tile 17 (T17) | F[4:7] | 436 |
| Tile 18 (T18) | F[8:11] | 438 |
| Tile 19 (T19) | F[12:15] | 440 |
| Tile 20 (T20) | F[16:19] | 442 |
| Tile 21 (T21) | F[20:23] | 444 |
| Tile 22 (T22) | F[24:27] | 446 |
| Tile 23 (T23) | F[28:31] | 448 |
| Tile 24 (T24) | F[32:35] | 450 |

TILES FOR FOURTH SET OF OPERATIONS

CONVOLUTION OUTPUTS

Matrix 500 * Matrix 520 = $\begin{array}{|c|c|} \hline C0_{00} & C0_{01} \\ \hline C0_{10} & C0_{11} \\ \hline \end{array}$ 560

Matrix 500 * Matrix 525 = $\begin{array}{|c|c|} \hline C1_{00} & C1_{01} \\ \hline C1_{10} & C1_{11} \\ \hline \end{array}$ 562

Matrix 500 * Matrix 530 = $\begin{array}{|c|c|} \hline C2_{00} & C2_{01} \\ \hline C2_{10} & C2_{11} \\ \hline \end{array}$ 564

Matrix 500 * Matrix 535 = $\begin{array}{|c|c|} \hline C3_{00} & C3_{01} \\ \hline C3_{10} & C3_{11} \\ \hline \end{array}$ 566

Matrix 505 * Matrix 520 = $\begin{array}{|c|c|} \hline C4_{00} & C4_{01} \\ \hline C4_{10} & C4_{11} \\ \hline \end{array}$ 568

Matrix 505 * Matrix 525 = $\begin{array}{|c|c|} \hline C5_{00} & C5_{01} \\ \hline C5_{10} & C5_{11} \\ \hline \end{array}$ 570

Matrix 505 * Matrix 530 = $\begin{array}{|c|c|} \hline C6_{00} & C6_{01} \\ \hline C6_{10} & C6_{11} \\ \hline \end{array}$ 572

Matrix 505 * Matrix 535 = $\begin{array}{|c|c|} \hline C7_{00} & C7_{01} \\ \hline C7_{10} & C7_{11} \\ \hline \end{array}$ 574

Matrix 510 * Matrix 520 = $\begin{array}{|c|c|} \hline C8_{00} & C8_{01} \\ \hline C8_{10} & C8_{11} \\ \hline \end{array}$ 576

Matrix 510 * Matrix 525 = $\begin{array}{|c|c|} \hline C9_{00} & C9_{01} \\ \hline C9_{10} & C9_{11} \\ \hline \end{array}$ 578

Matrix 510 * Matrix 530 = $\begin{array}{|c|c|} \hline C10_{00} & C10_{01} \\ \hline C10_{10} & C10_{11} \\ \hline \end{array}$ 580

Matrix 510 * Matrix 535 = $\begin{array}{|c|c|} \hline C11_{00} & C11_{01} \\ \hline C11_{10} & C11_{11} \\ \hline \end{array}$ 582

Matrix 515 * Matrix 520 = $\begin{array}{|c|c|} \hline C12_{00} & C12_{01} \\ \hline C12_{10} & C12_{11} \\ \hline \end{array}$ 584

Matrix 515 * Matrix 525 = $\begin{array}{|c|c|} \hline C13_{00} & C13_{01} \\ \hline C13_{10} & C13_{11} \\ \hline \end{array}$ 586

Matrix 515 * Matrix 530 = $\begin{array}{|c|c|} \hline C14_{00} & C14_{01} \\ \hline C14_{10} & C14_{11} \\ \hline \end{array}$ 588

Matrix 515 * Matrix 535 = $\begin{array}{|c|c|} \hline C15_{00} & C15_{01} \\ \hline C15_{10} & C15_{11} \\ \hline \end{array}$ 590

PERFORMING TENSOR OPERATIONS USING A PROGRAMMABLE CONTROL ENGINE

BACKGROUND

The present disclosure relates to a computing system. More particularly, the present disclosure relates to techniques for training neural networks and using neural networks for inference.

A neural network is a machine learning model used for a variety of different applications (e.g., image classification, computer vision, natural language processing, speech recognition, writing recognition, etc.). A neural network may be trained for a particular purpose by running datasets through it, comparing results from the neural network to known results, and updating the network based on the differences.

BRIEF DESCRIPTION OF THE DRAWINGS

Various embodiments of the present disclosure are illustrated by way of example and not limitation in the figures of the accompanying drawings.

FIGS. 2A-2E illustrate an example of storing a single three-dimensional (3D) matrix in memory based on depth according to some embodiments.

FIGS. 5A-5I illustrate example matrix operations performed in parallel on matrices stored in memory based on depth according to some embodiments

FIG. 11 illustrates an example matrix operation on a padded matrix according to some embodiments.

FIG. 12 illustrates an example of matrix dilation according to some embodiments.

FIG. 13 illustrates an example matrix operation on a dilated matrix according to some embodiments.

DETAILED DESCRIPTION

Figure 1:
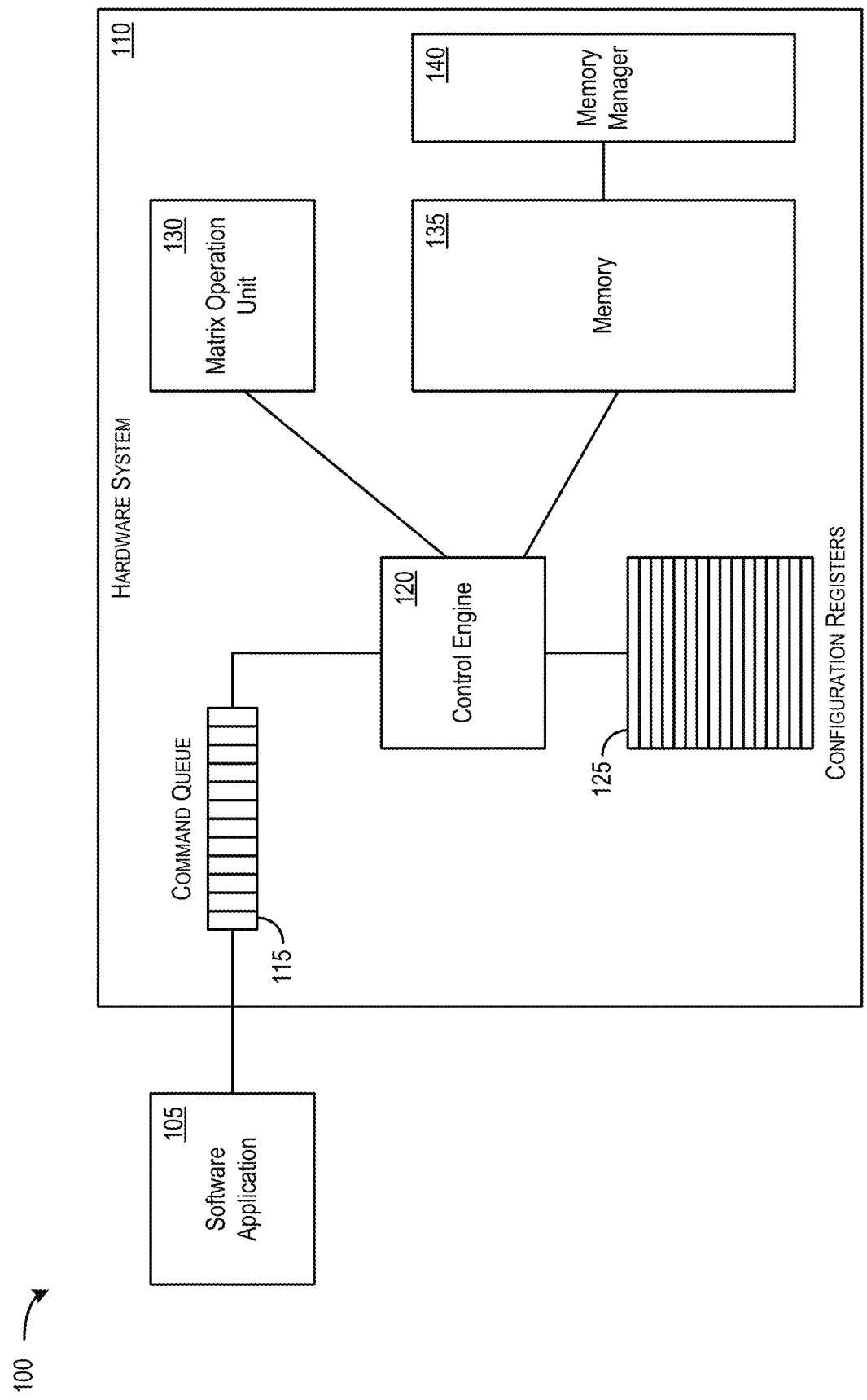
FIG. 1 illustrates a system according to some embodiments.

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident to one skilled in the art, based on the language of the different claims, that the claimed subject matter may include some or all of the features in these examples, alone or in combination, and may further include modifications and equivalents of the features and techniques described herein.

Described here are techniques for storing tensors in memory based on depth. In some embodiments, a system includes a software application and a hardware system. The hardware system may be configured to store three-dimensional (3D) tensors (e.g., 3D matrices) in memory based on the depth axes of the 3D tensors. For example, to store a particular 3D tensor, the hardware system can determine a particular position along the height and width axes of the particular 3D tensor. Then, the hardware system identifies elements along the depth axis of the 3D tensors and stores those elements in a contiguous block of memory (also referred to as a tile of memory). The hardware system iteratively determines different positions along the height and width axes of the particular 3D tensor, identifies elements along the depth axis of the particular 3D tensor, and stores the identified elements in a contiguous block of memory.

The techniques for storing 3D tensors in memory described in the present application provide a number of benefits and advantages over conventional methods of storing tensors. For instance, storing 3D tensors based on elements along the depth of the tensors may improve the manner in which data is accessed from the 3D tensors. For example, for certain tensor operations, storing 3D tensors in this manner can improve the efficiency of performing those tensor operations on the 3D tensors by, for example, reducing the number of reads necessary to retrieve elements of the 3D tensors and/or reducing reading the same data from memory multiple times (e.g., avoiding duplication of data).

In addition, described here are techniques for performing tensor operations using a programmable control engine. In some embodiments, the hardware system mentioned above includes a programmable control engine, several sets of configuration registers, and a matrix multiplication unit. Each set of configuration registers are configured to store a set of configuration parameters. The hardware system can receive commands for setting values of parameters in the sets of configuration registers. The configuration parameters of a particular set of configuration registers control how the control engine executes a given set of operations using the matrix multiplication unit. For instance, the hardware system may receive a command to execute a set of tensor operations (e.g., matrix multiplication operations, convolution operations, etc.) using the configuration parameters of a particular a set of configuration registers. The control engine executes the set of tensor operations differently depending on which set of configuration registers are specified in the command. That is, a command to execute the set of tensor operations using a first set of configuration registers causes the control engine to execute the set of tensor operations one way. A command to execute the set of tensor operations using a second, different set of configuration registers causes the control engine to execute the set of tensor operations another, different way.

The techniques for performing tensor operations described in the present application provide a number of benefits and advantages over conventional methods of performing tensor operations. For example, having a control engine in a hardware system that can be dynamically programmed to perform operations differently allows tensor operations to be implemented using a single, flexible hardware system. This reduces the amount of hardware resources needed to perform such operations. Conventional techniques for performing these tensor operations may require separate hardware systems and/or additional hardware components to achieve the same results.

FIG. 1 illustrates a system 100 according to some embodiments. As shown, system 100 includes software application 105 and hardware system 110. Software application 105 can be a software program that is configured to send commands to hardware system 110. Examples of such commands include commands to set values of parameters in configuration registers 125 and commands to execute tensor operations. In some embodiments, hardware system 110 is implemented by computing hardware. Examples of such computing hardware include AI accelerators, general purpose computing devices, graphics processing units (GPUs), field-programmable gate arrays (FPGAs), application-specific integrated circuits (ASICs), etc.

As illustrated in FIG. 1, hardware system 110 includes command queue 115 (a first circuit), control engine 120 (a fifth circuit), configuration registers 125 (a second circuit), matrix operation unit (MOU) 130 (a third circuit), memory 135 (a fourth circuit), and memory manager 140. Memory 135 may be responsible for storing data for hardware system 110. For example, memory 135 can be used to store tensors (e.g., matrices) using the depth-based techniques described in the present application. In some embodiments, memory 135 may be random-access memory (RAM). In some cases, memory 135 can be volatile memory while, in other cases, memory 135 can be non-volatile memory. Memory manager 140 is responsible for managing data stored in memory 135. For example, memory manager 140 can receive a matrix and a request to store the matrix in memory 135. In response to the request, memory manager 140 may generate tiles of memory and store elements from the matrix in the tiles of memory.

Command queue 115 is responsible for storing commands in a queue that are to be executed by control engine 120. For example, when command queue 115 receives a command from software application 105, command queue 115 stores the command in its queue. Command queue 115 may receive a request for a command from control engine 120. In response, command queue 115 removes a command from the queue and sends the command to control engine 120. In some embodiments, command queue 115 is a first in, first out (FIFO) queue where commands are removed from the queue in the order in which they are received. For example, command queue 115 can receive a first command from software application 105, which command queue 115 stores in its queue. At a subsequent point in time, command queue 115 may receive a second command from software application 105, which command queue 115 stores in its queue. Upon receiving a request for a command from control engine 120, command queue 115 removes the first command from its queue and sends it to control engine 120.

Control engine 120 is configured to execute various commands that hardware system 110 receives from software application 105. For example, control engine 120 can iteratively send command queue 115 a request for a command and execute the command received from command queue 115. Control engine 120 may execute a number of different types of commands. For instance, one type of command that control engine 120 is configured to execute are commands for setting a value for a parameter in a set of configuration registers. Once control engine 120 receives a command of this type, control engine writes the value specified in the command for the parameter specified in the command in the set of configuration registers specified in the command. Another type of command that control engine 120 is configured to execute are commands to execute tensor operations using a particular set of configuration registers. To execute this type of command, control engine 120 retrieves the set of configuration registers specified in the command and then executes the tensor operations specified in the command using the retrieved set of configuration registers.

Configuration registers 125 store configuration parameters that are used for executing commands by control engine 120. As shown, configuration registers 125 includes sixteen sets of configuration registers. One of ordinary skill in the art will appreciate that configuration registers 125 may include a different number of sets of configuration registers in some embodiments (e.g., eight sets of configuration registers, 32 sets of configuration registers, etc.). Each set of configuration registers includes the same set of configuration parameters. The values of the configuration parameters in the sets of configuration registers may be different. Examples of configuration parameters include an output column major parameter, an operand A row parameter, an operand A column parameter, an operand B row parameter, an operand B column parameter, an operand A dilation row parameter, an operand A dilation column parameter, an operand B dilation row parameter, an operand B dilation column parameter, an operand A row step parameter, an operand B row step parameter, an output row step parameter, an input image channel depth parameter, a number of filters parameter, an image left padding parameter, an image right padding parameter, an image top padding parameter, an image bottom padding parameter, a stride row parameter, and a stride column parameter.

The output column major parameter is for indicating whether to write an output in column-major order or row-major order. The operand A row parameter is for indicating the number of rows of operand A. The operand A column parameter is for indicating the number of columns of operand A. The operand B row parameter is for indicating the number of rows of operand B. The operand B column parameter is for indicating the number of columns of operand B. The operand A dilation row parameter is for indicating the dilation value for the rows of operand A. The operand A dilation column parameter is for indicating the dilation value for the columns of operand A. The operand B dilation row parameter is for indicating the dilation value for the rows of operand B. The operand B dilation column parameter is for indicating the dilation value for the columns of operand B. The operand A row step parameter is for indicating the step value for operand A. The operand B row step parameter is for indicating the step value for operand B. The output row step parameter is for indicating the step value for the output. The input image channel depth parameter is for indicating the depth of the channel of an input image. The number of filters parameter is for indicating the number of filters in a filter matrix. The image left padding parameter is for indicating the amount of padding on the left side of an input image. The image right padding parameter is for indicating the amount of padding on the right side of an input image. The image top padding parameter is for indicating the amount of padding on the top of an input image. The image bottom padding parameter is for indicating the amount of padding on the bottom of an input image. The stride row parameter is for indicating the number of rows to shift a filter over an input image. The stride column parameter is for indicating the number of columns to shift a filter over an input image. Additional details about these configuration parameters will be described below.

MOU 130 is configured to perform matrix operations on matrices. For example, MOU 130 may receive from control engine 120 a request to perform a matrix multiplication operation. The request includes a first matrix and a second matrix for the matrix multiplication operation. In response to the request, MOU 130 performs a matrix multiplication operation on the first and second matrices. MOU 130 sends control engine 120 the output matrix generated from the operation. In some cases, MOU 130 can receive a request from control engine 120 to perform element multiplication operations (e.g., Hadamard product operations).

I. Depth-Based Tensor Storage

As mentioned above, described in this application are techniques for storing tensors in memory based on depth. The following FIGS. 2-5 will demonstrate several examples and embodiments related to such techniques. In some embodiments, memory manager 140 employs these techniques to store tensors and matrices in memory 135. In other embodiments, these techniques may be implemented in software (e.g., a software program that operates on or interacts with hardware system 110). The matrices used in the examples and embodiments described in section II can also be stored based on depth.

Figure 2A:
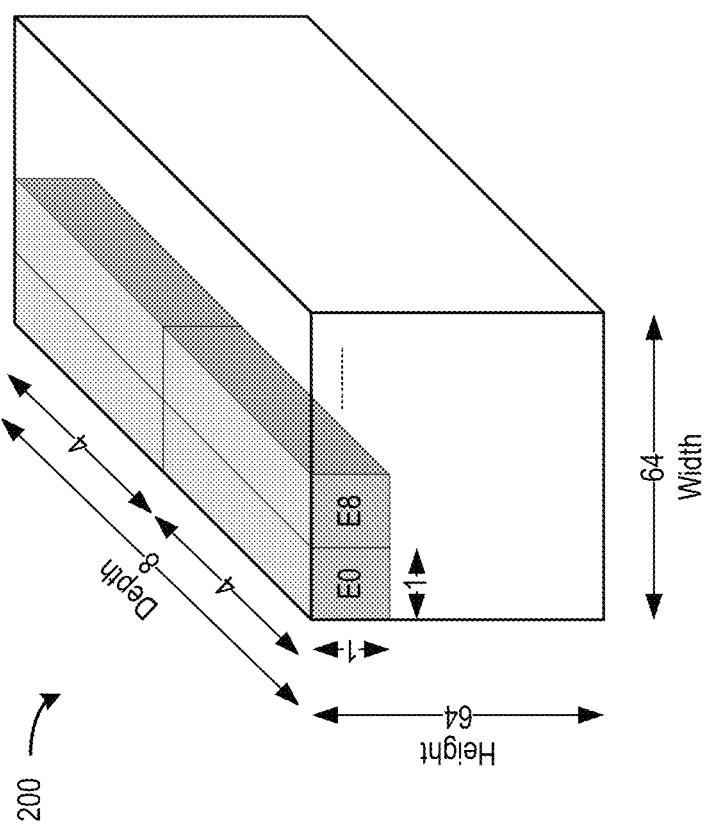

FIGS. 2A-2E illustrate an example of storing a single 3D matrix in memory based on depth according to some embodiments. As shown in FIG. 2A, matrix 200 is a 3D matrix with a height of 64 (e.g., 64 rows), a width of 64 (e.g., 64 columns), and a depth of 8 (e.g., 8 layers). That is, matrix 200 is configured to store 64 elements along the height axis, 64 elements along the width axis, and 8 elements along the depth axis. The top row of matrix 200 will be referred to as the first row and the bottom row of matrix 200 will be referred to as the last row. Similarly, the left-most column of matrix 200 will be referred to as the first column and the right-most column of matrix 200 will be referred to as the last column. The layer at the front of matrix 200 will be referred to as the first layer and the layer at the back of matrix 200 will be referred to as the last layer. At the first row and first column of matrix 200, the first element in the first layer is referred to as E0, the second element in the second layer is referred to as E1, the third element in the third layer is referred to as E2, etc. The eighth element in the last layer at this position of the first row and the first column of matrix 200 is referred to as E7. As shown, at the first row and second column of matrix 200, the first element in the first layer is referred to as E8. The second element in the second layer is referred to as E9, the third element in the third layer is referred to as E10, etc. The eighth element in the last layer at the first row and the second column of matrix 200 is referred to as E15. Other elements (not shown) in matrix 200 are referred to in a similar manner.

Figure 2B:
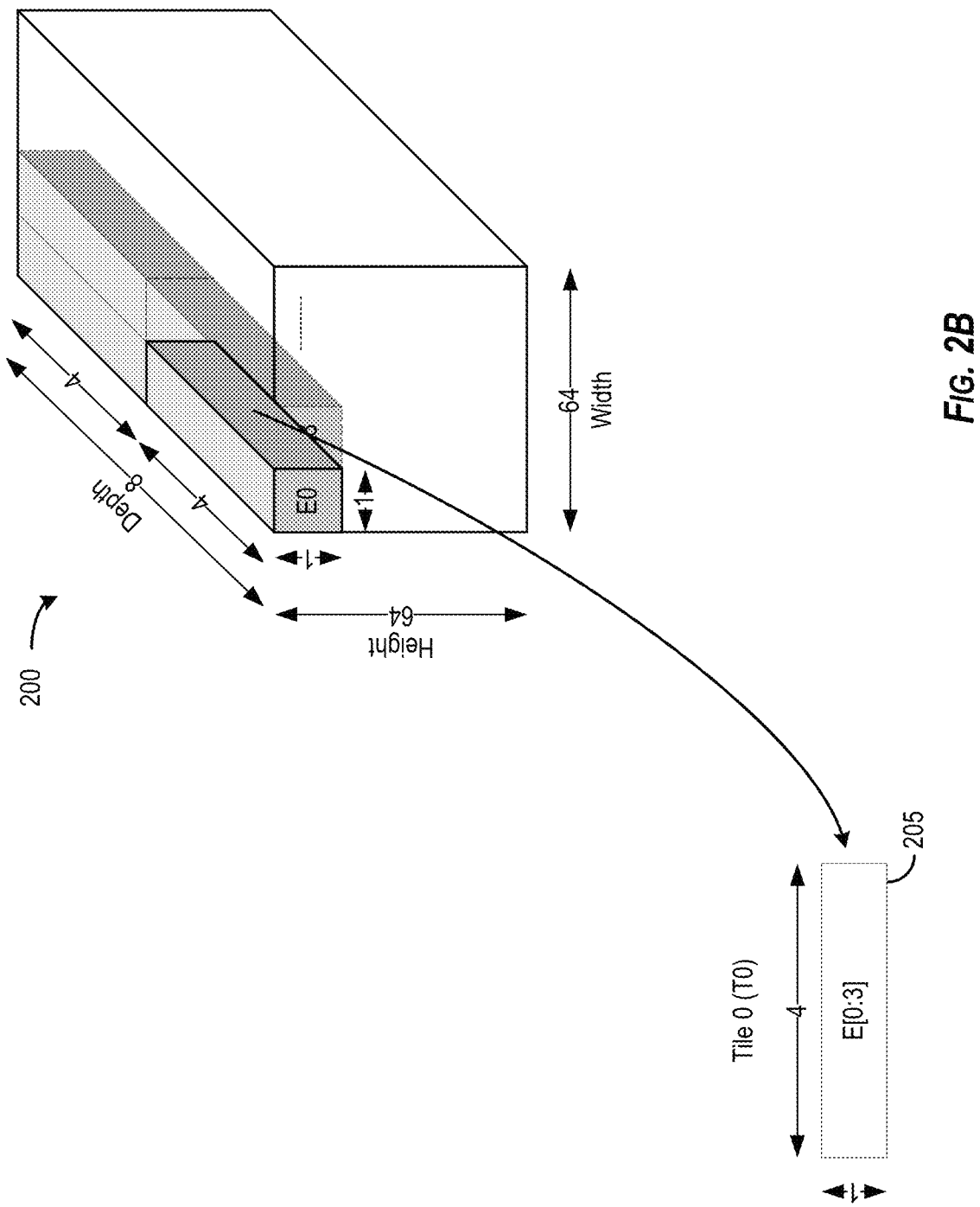

FIG. 2B illustrates storing elements in matrix 200 in a first tile of memory. In some embodiments, a tile of memory is a contiguous block of memory (e.g., stored in memory 135). In this example, each tile of memory is configured to store four elements (e.g., four floating point numbers) of matrix 200. To generate the first tile of memory for matrix 200, memory manager 140 starts at the location of the first row and first column of matrix 200, identifies the first four elements along the depth axis (i.e., the elements in the first four layers at the first row and first column of matrix 200), and stores them in a contiguous block of memory in memory 135. As shown in FIG. 2B, memory manager 140 identifies elements E0-E3 and stores them in a first tile of memory 205 (tile 0/T0). Therefore, elements E0-E3 of matrix 200 are stored in consecutively addressed memory locations. For instance, if element E0 is stored at memory address 50, element E1 would be stored at memory address 51, element E2 would be stored at memory address 52, and element E3 would be stored at memory address 53.

Figure 2C:
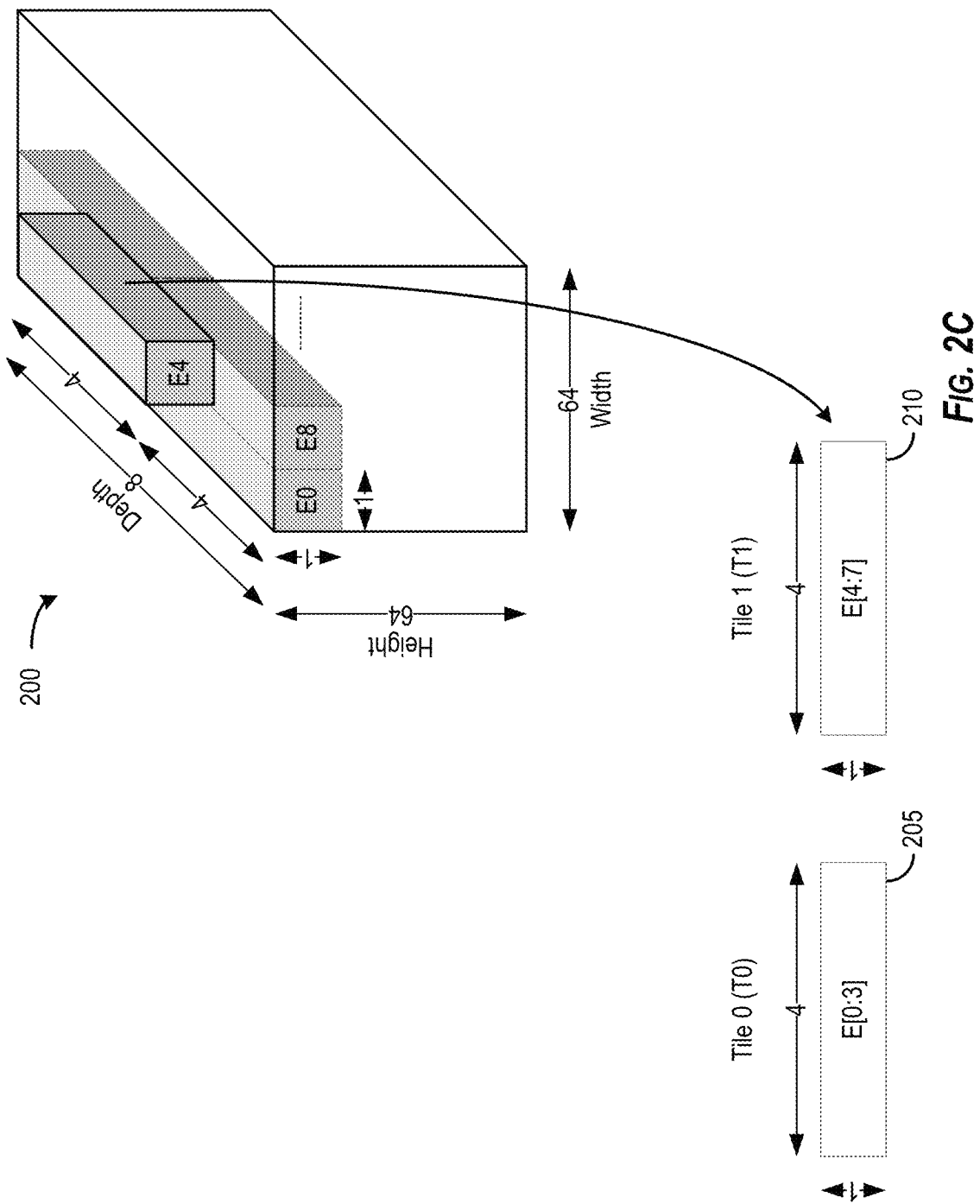

FIG. 2C illustrates storing elements in matrix 200 in a second tile of memory. When there are still elements along the depth axis at a particular row and column of a matrix that have not been stored in a tile of memory, the elements are iteratively stored in tiles of memory until there are no elements left along the depth axis. Here, elements E4-E7 in the last four layers at the first row and first column of matrix 200 have not been stored in a tile of memory. As such, memory manager 140 generates a second tile of memory 210 (tile 1/T1) by storing elements E4-E7 from matrix 200 in a contiguous block of memory in memory 135.

Figure 2D:
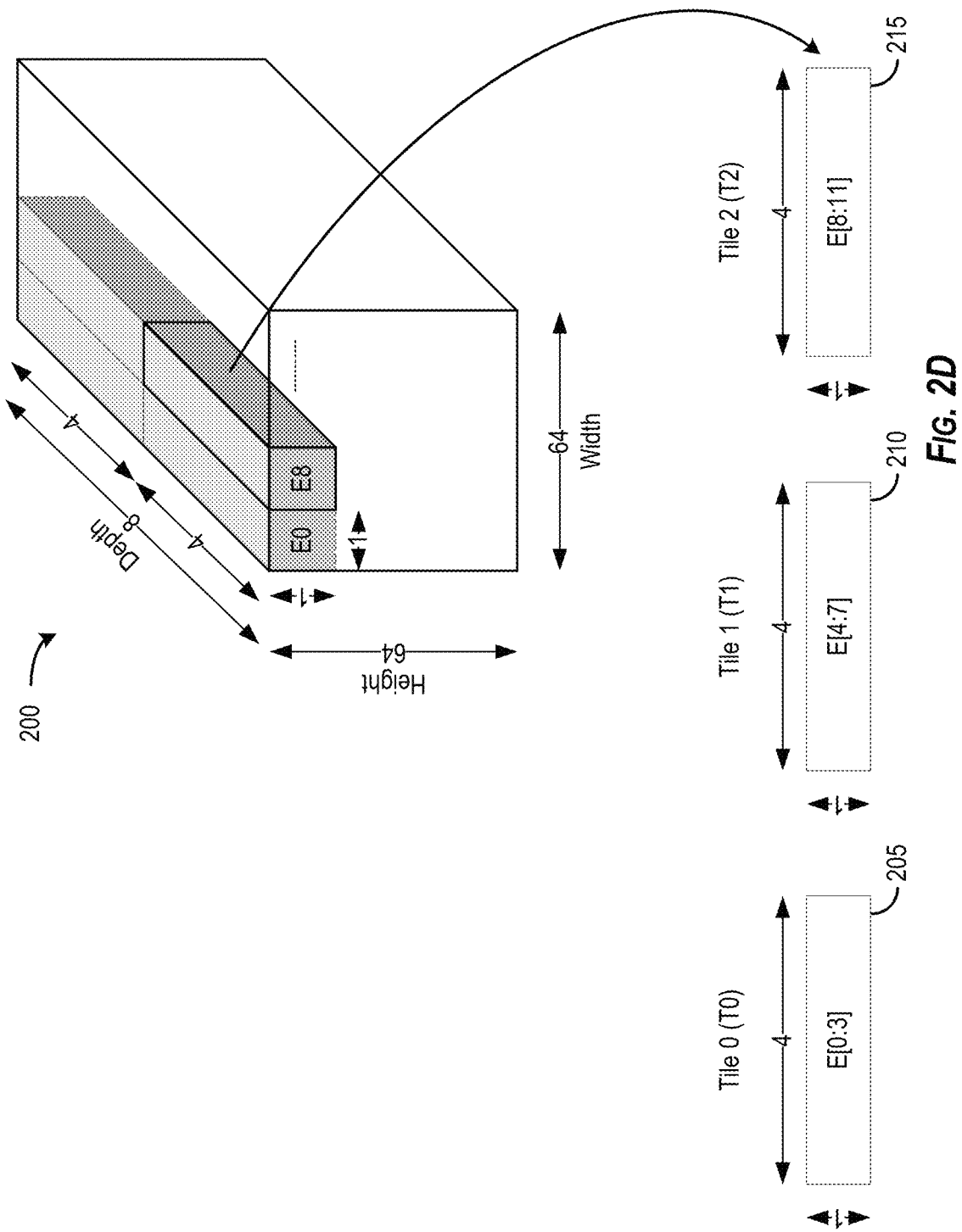

FIG. 2D illustrates storing elements in matrix 200 in a third tile of memory. Since there are no more elements left at the first row and first column of matrix 200 to store in tiles of memory, memory manager 140 iterates to the next column (the second column in this example) of the first row in matrix 200. As shown, memory manager 140 generates a third tile of memory 215 (tile 2/T2) by storing elements E8-E11 from matrix 200 in a contiguous block of memory in memory 135.

FIG. 2E illustrates storing elements in matrix 200 in a fourth tile of memory. As mentioned above, memory manager 140 iteratively stores elements along the depth axis at a particular row and column of a matrix in a tile of memory until there are no elements left along the depth axis. In this example, there are still four elements left along the depth axis at the first row and second column of matrix 200. Therefore, memory manager 140 generates a fourth tile of memory 220 (tile 3/T3) by storing elements E12-E15 from matrix 200 in a contiguous block of memory in memory 135, as illustrated in FIG. 2E.

FIGS. 2A-2E show how memory manager 140 stores elements in matrix 200 along the depth axis at the first row and first column and the first row and second column of matrix 200. To store remaining elements in matrix 200, memory manager 140 iterates through the rest of the columns (e.g., columns 3-64) in the first row and stores elements along the depth axes in tiles of memory in the same manner depicted in FIGS. 2A-2E. Then, memory manager 140 moves to the second row and iterates through each of the columns in the second row and stores elements along the depth axis in tiles of memory using the same techniques shown in FIGS. 2A-2E. Memory manager 140 repeats this for the rest of the rows in matrix 200 until all of the elements in matrix 200 are stored in tiles of memory.

FIGS. 3A-3D illustrate an example of storing several 3D matrices in memory based on depth according to some embodiments. Unlike the technique described above by reference to FIGS. 2A-2E where elements from a single matrix are stored in tiles of memory, the example illustrated in FIGS. 3A-3D show elements from multiple matrices stored in tiles of memory. This example starts with FIG. 3A where matrices 300A-N are shown. Each of the matrices 300A-N are similar to matrix 200. In particular, each of the matrices 300A-N is a 3D matrix with a height of 64 (e.g., 64 rows), a width of 64 (e.g., 64 columns), and a depth of 8 (e.g., 8 layers). The same naming convention used to refer to elements in matrix 200 will be used to refer to elements in matrices 300A-N.

Figure 3A:
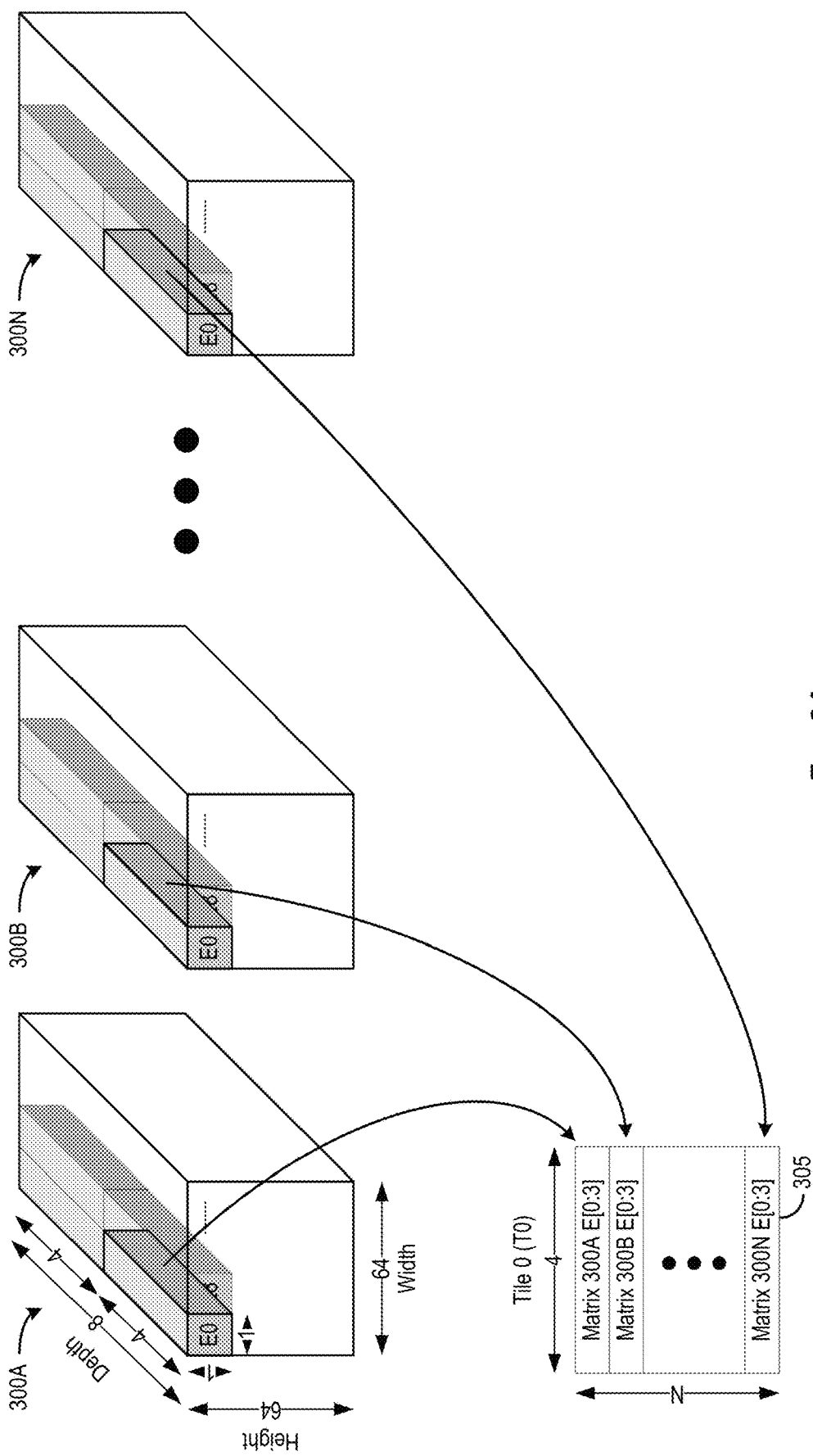
FIGS. 3A-3D illustrate an example of storing several 3D matrices in memory based on depth according to some embodiments.

FIG. 3A also illustrates storing elements in matrices 300A-N in a first tile of memory. For this example, each tile of memory is configured to store 4N elements, where N is the number of matrices. To generate a first tile of memory 305 (tile 0/T0), memory manager 140 starts at the location of the first row and first column of matrix 300A, identifies the first four elements E0-E3 along the depth axis (i.e., the elements in the first four layers at the first row and first column of matrix 300A), and stores them in tile of memory 305. Next, memory manager140 starts at the location of the first row and first column of matrix 300B, identifies the first four elements E0-E3 along the depth axis (i.e., the elements in the first four layers at the first row and first column of matrix 300B), and stores them in tile of memory 305 right after the four elements E0-E3 from matrix 300A. Memory manager 140 repeats this process for each of the remaining matrices 300C-N. As a result, tile of memory 305 includes the elements E0-E3 from each of the matrices 300A-N stored in consecutively addressed memory locations in a contiguous block of memory. For example, if element E0 of matrix 300A is stored at memory address 100, element E1 of matrix 300A would be stored at memory address 101, element E2 of matrix 300A would be stored at memory address 102, element E3 of matrix 300A would be stored at memory address 103, element E0 of matrix 300B would be stored at memory address 104, element E1 of matrix 300B would be stored at memory address 105, etc.

Figure 3B:
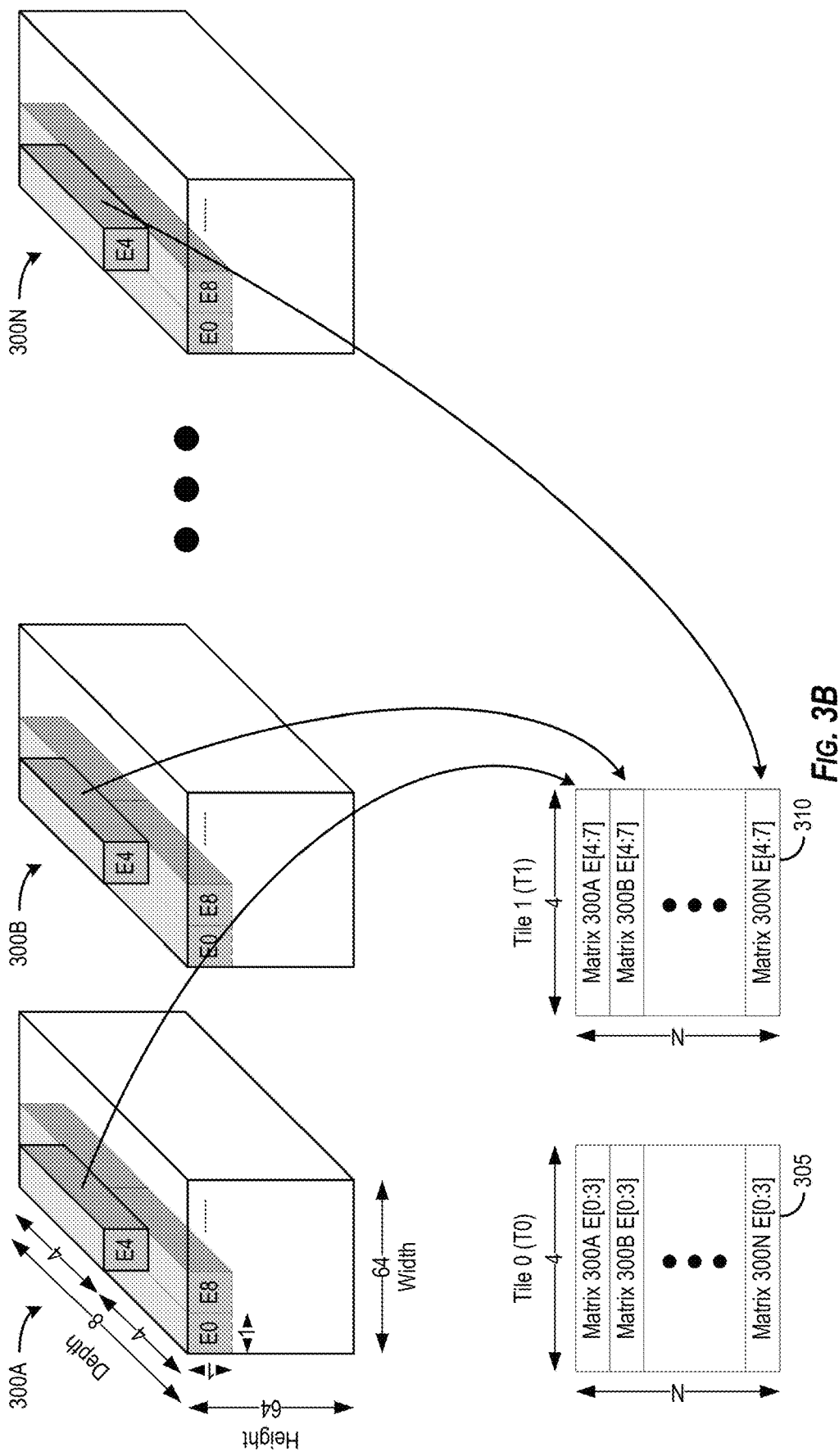

FIG. 3B illustrates storing elements in matrices 300A-N in a second tile of memory. As explained above, memory manager 140 iteratively stores elements along the depth axis at a particular row and column of a matrix in tiles of memory that have not been stored in a tile of memory. In this example, elements E4-E7 in the last four layers at the first row and first column of matrices 300A-N have not been stored in a tile of memory. Hence, memory manager 140 generates a second tile of memory 310 (tile 1/T1), which is a contiguous block of memory in memory 135, by storing elements E4-E7 from matrix 300A, followed by elements E4-E7 from matrix 300B, followed by elements E4-E7 from matrix 300C, etc.

Figure 3C:
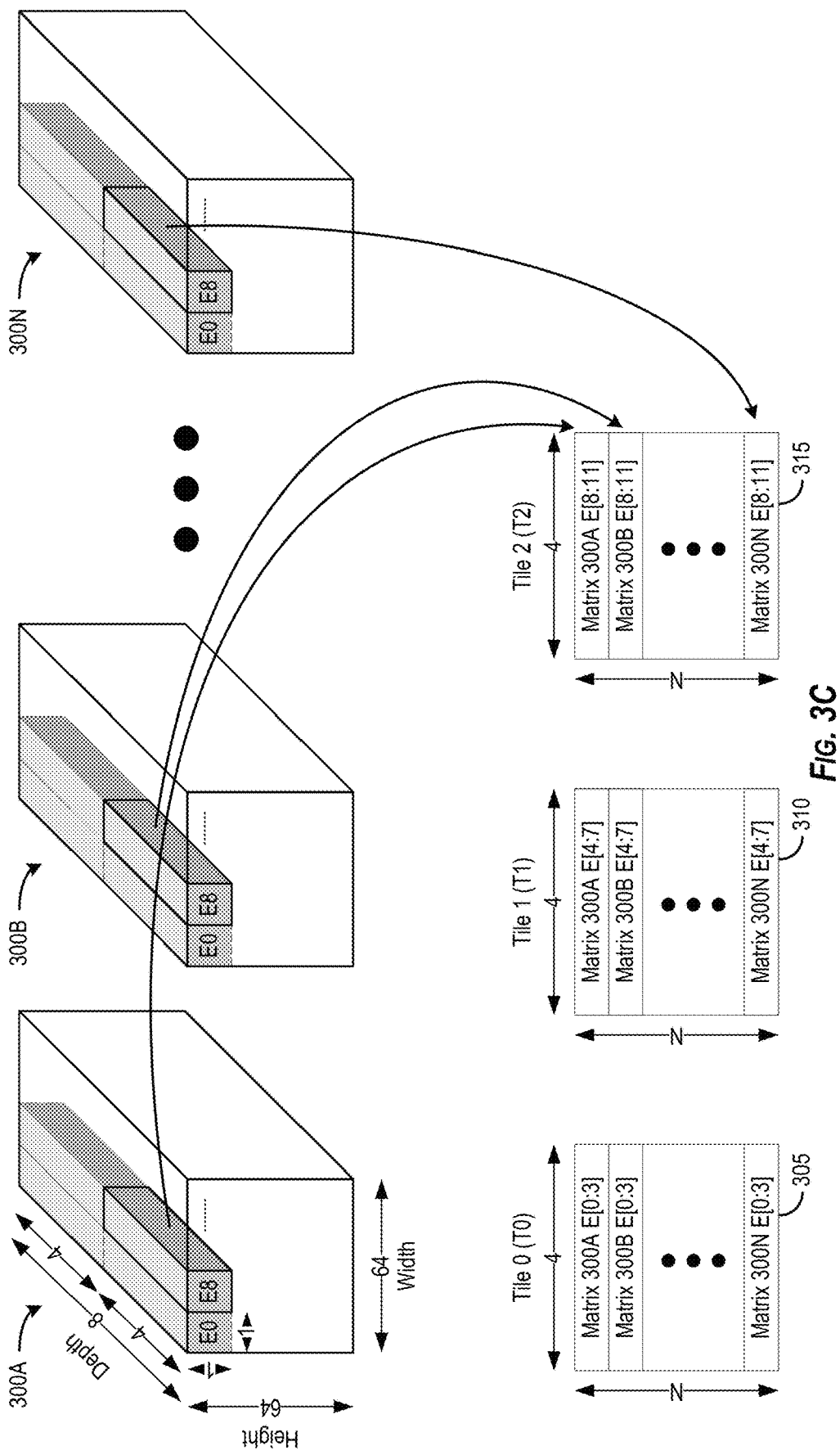

FIG. 3C illustrates storing elements in matrices 300A-N in a third tile of memory. As there are no elements left at the first row and first column of matrices 300A-N to store in tiles of memory, memory manager 140 iterates to the next column (the second column in this example) of the first row in matrices 300A-N. As illustrated in FIG. 3C, memory manager 140 generates a third tile of memory 315 (tile 2/T2) by storing elements E8-E11 from matrix 300A, followed by elements E8-E11 from matrix 300B, followed by elements E8-E11 from matrix 300C, etc., in a contiguous block of memory in memory 135.

Figure 3D:
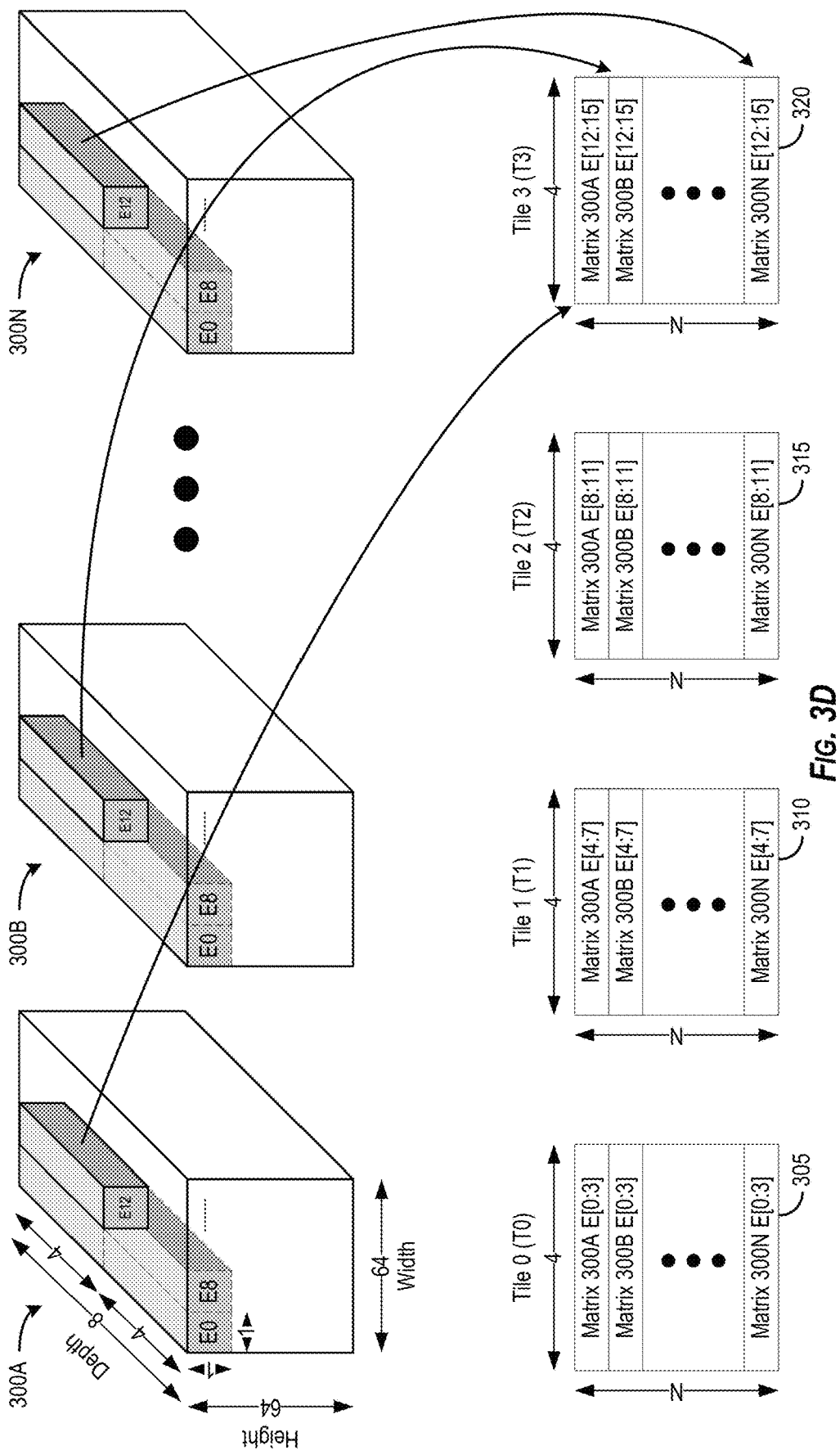

FIG. 3D illustrates storing elements in matrices 300A-N in a fourth tile of memory. As described above, memory manager 140 iteratively stores elements along the depth axis at a particular row and column of matrices in a tile of memory until there are no elements left along the depth axis. Here, there are still four elements left along the depth axis at the first row and second column of matrices 300A-N. Thus, memory manager 140 generates a fourth tile of memory 320 (tile 3/T3) by storing elements E12-E15 from matrix 300A, followed by elements E12-E15 from matrix 300B, followed by elements E12-E15 from matrix 300C, etc., in a contiguous block of memory in memory 135.

FIGS. 3A-3D depict how memory manager 140 stores elements in matrices 300A-N along the depth axis at the first row and first column and the first row and second column of matrices 300A-N. Memory manager 140 stores remaining elements in matrices 300A-N by iterating through the rest of the columns (e.g., columns 3-64) in the first row and storing elements along the depth axes in tiles of memory in the same manner shown in FIGS. 3A-3D. Next, memory manager 140 moves to the second row of matrices 300A-N and iterates through each of the columns in the second row and stores elements along the depth axis in tiles of memory using the same techniques shown in FIGS. 3A-3D. Memory manager 140 repeats this for the rest of the rows in matrices 300A-N until all of the elements in matrices 300A-N are stored in tiles of memory. Storing elements from several different matrices in tiles of memory in the manner illustrated in FIGS. 3A-3D allows for matrix operations to be performed on the matrices in parallel.

FIGS. 2 and 3 illustrate examples of how to store tensors in tiles of memory based on depth. In some embodiments, the size of each tile of memory is determined based on the size of the smallest chunk of memory that can be read from memory 135. In some instances, if memory 135 is configured to store data in a defined number of byte chunks (e.g., 16 byte chunks, 32 byte chunks, 64 byte chunks, etc.), then memory manager 140 determines the size of each tile of memory so that it is a multiple of the defined number of byte chunks. For example, in cases where memory 135 is configured to store data in 64 byte chunks, memory manager 140 determines the size of each tile of memory so that it is a multiple of 64 bytes. Memory manager 140 may also take into account the size of the data (e.g., 16 bit floating point numbers, 32 bit floating point numbers, 64 bit floating point numbers, etc.) that will be stored in a tile of memory to ensure that the size of the tile of memory is a multiple of the defined number of byte chunks. In some embodiments, when a tile of memory does not a multiple of the defined number of byte chunks, memory manager 140 can pad the tile of memory with a defined value (e.g., zeros) until the size of the tile of memory is a multiple of the defined number of byte chunks.

Figure 4A:
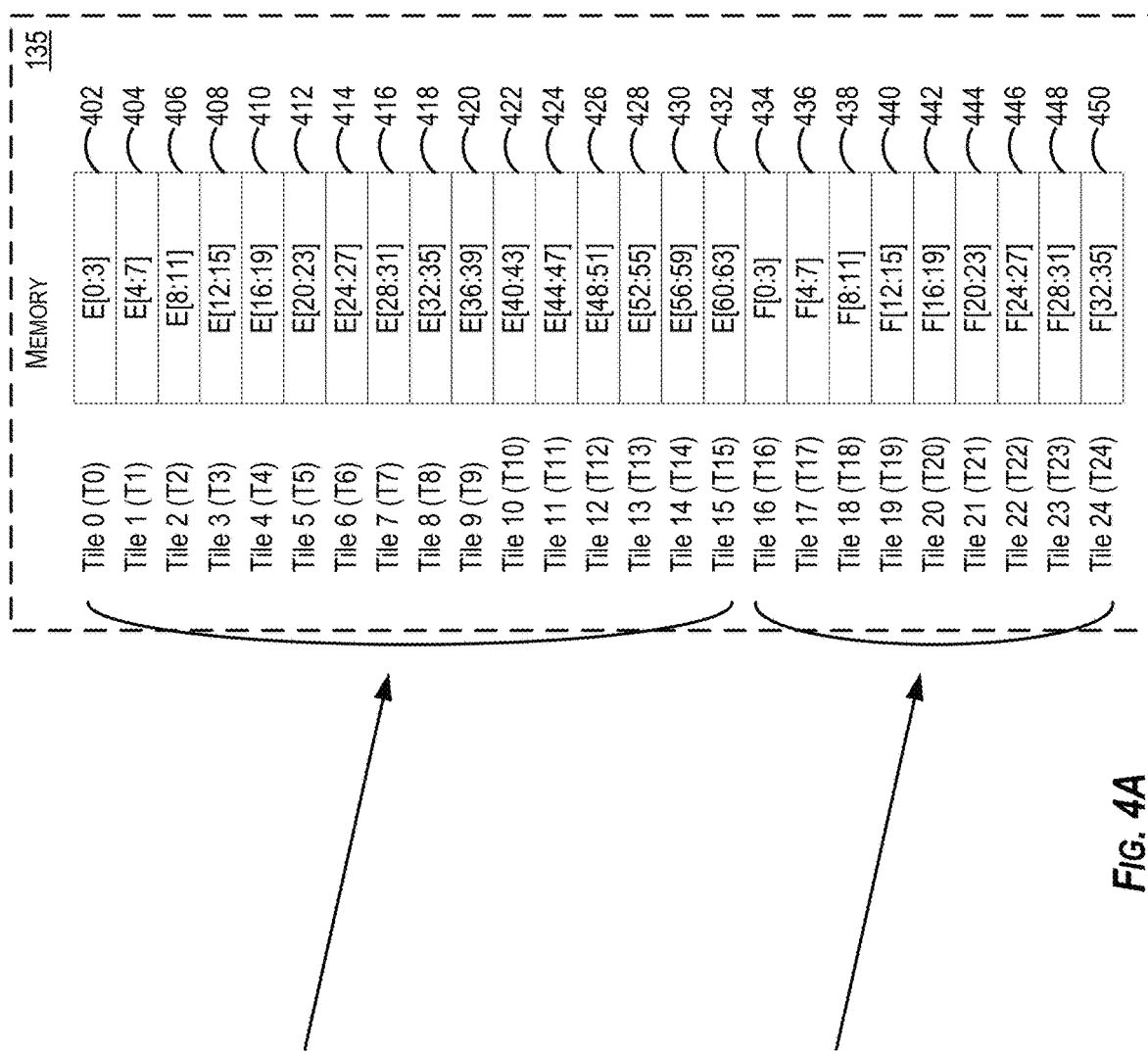
FIGS. 4A-4I illustrate example matrix operations performed on matrices stored in memory based on depth according to some embodiments.
Figure 4A:
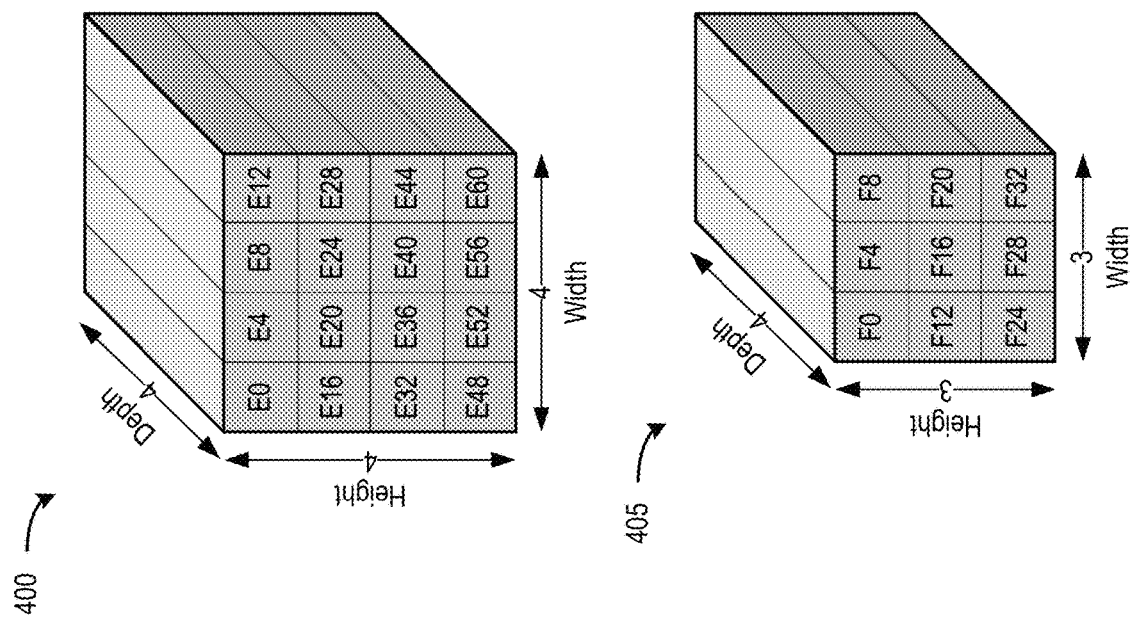

FIGS. 4A-4I illustrate example matrix operations performed on matrices stored in memory based on depth according to some embodiments. Specifically, FIGS. 4A-4I illustrate a convolution operation performed between two matrices. As shown in FIG. 4A, the two matrices in this example are matrix 400 and matrix 405. Matrix 400 is a 3D matrix with a height of 4 (e.g., 4 rows), a width of 4 (e.g., 4 columns), and a depth of 4 (e.g., 4 layers). Matrix 405 is a 3D matrix with a height of 3 (e.g., 3 rows), a width of 3 (e.g., 3 columns), and a depth of 4 (e.g., 4 layers). For this example, the techniques for storing a matrix in memory based on depth shown in FIGS. 2A-2E are used to store each of the matrices 400 and 405. Additionally, FIG. 4A shows the tiles of memory used to store matrices 400 and 405. In this example, each tile of memory is configured to store four elements. As shown, tiles of memory 402-432 (tiles 0-15/T0-15), which are stored in memory 135, store the elements of matrix 400. Tiles of memory 434-450 (tiles 16-24/T16-24), which are also stored in memory 135, store the elements of matrix 405.

Figure 4B:
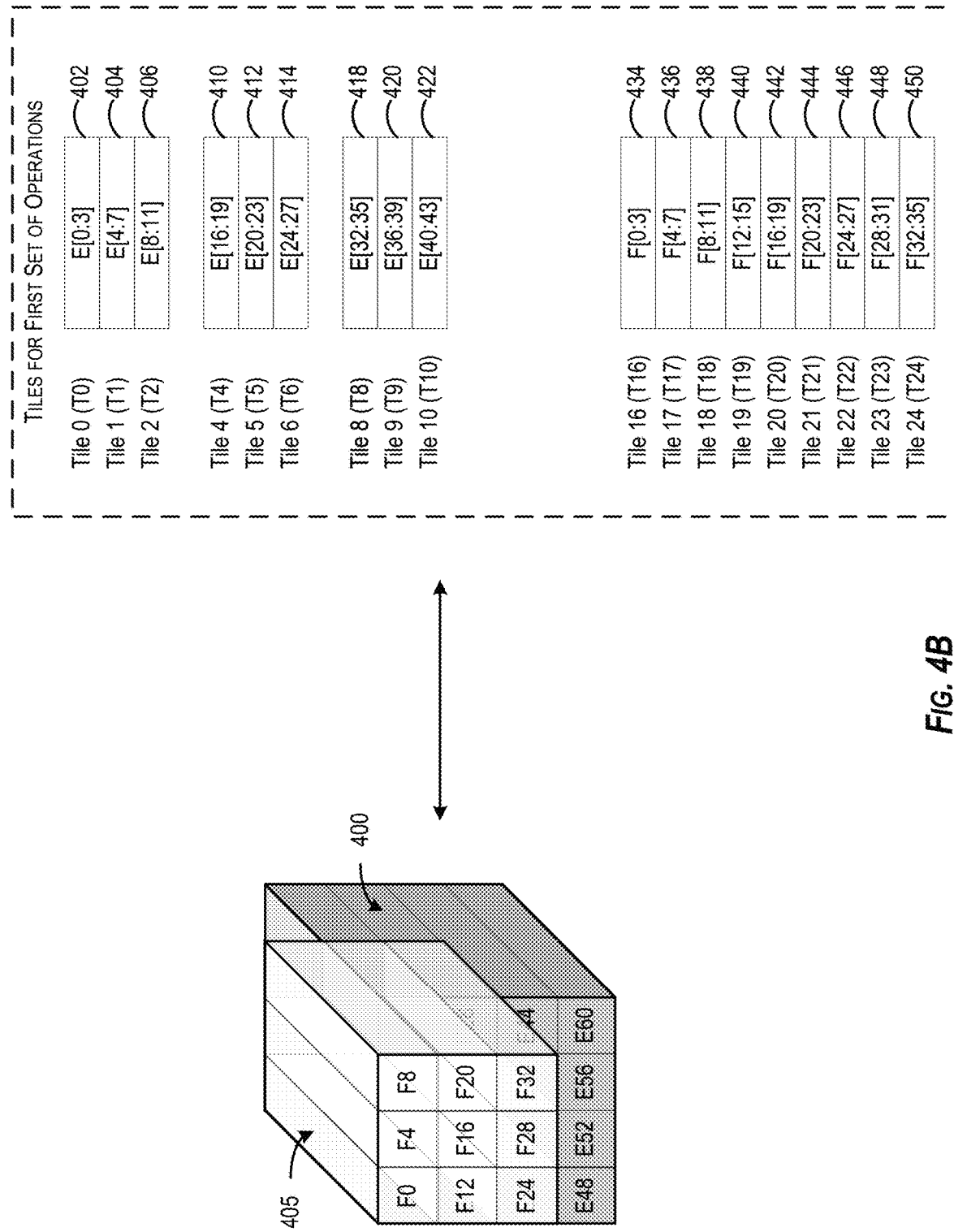

In the first set of matrix operations for the convolution operation, each element in matrix 405 is multiplied with a corresponding element in matrix 400 based on the positioning of matrices 400 and 405 shown in FIG. 4B. In particular, element F0 in matrix 405 is multiplied with element E0 in matrix 400, element F1 in matrix 405 is multiplied with element E1 in matrix 400, element F2 in matrix 405 is multiplied with element E2 in matrix 405, etc. The products are then added together. FIG. 4B also shows the tiles of memory used in the first set of operations of the convolution operation. The elements for matrix 400 used in the first set of operations are included in tiles of memory 402-406, 410-414, and 418-422 and the elements for matrix 405 are included in tiles of memory 434-450. Hardware system 110 (e.g., control engine 120) reads these tiles from memory for the first set of operations.

Figure 4C:
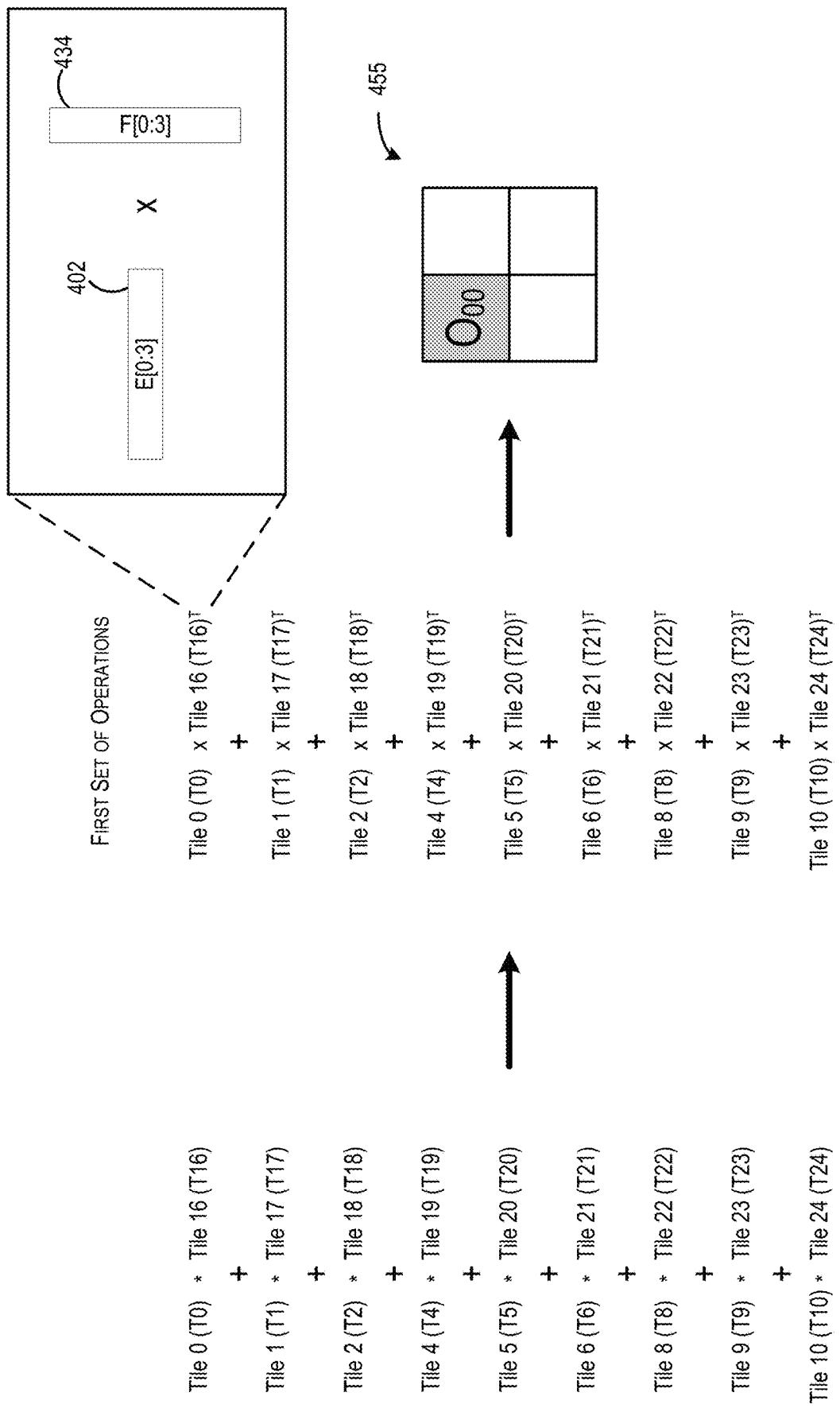

FIG. 4C illustrates the operations involved in the first set of operations for the convolution operation between matrices 400 and 405. As shown on the left side of FIG. 4C, the first set of operations can be represented as the sum of the products of corresponding elements in matrices 400 and 405 explained above. To implement the first set of operations, hardware system 110 may convert the sum of the products of corresponding elements in matrices 400 and 405 to a sum of matrix multiplication operations of the corresponding elements in matrices 400 and 405. Specifically, for each product of corresponding elements in matrices 400 and 405, hardware system 110 generates a transpose of the element in matrix 405 and performs a matrix multiplication between the corresponding element in matrix 400 and the transposed element from matrix 405, as depicted in the middle of FIG. 4C. For instance, as illustrated in FIG. 4C, the matrix multiplication between tile 0 and the transpose of tile 16 involves adding together the product of element E0 in tile 0 (i.e., element E0 in matrix 400) and element F0 in tile 16 (i.e., element F0 in matrix 405), the product of element E1 in tile 0 (i.e., element E1 in matrix 400) and element F1 in tile 16 (i.e., element F1 in matrix 405), the product of element E2 in tile 0 (i.e., element E2 in matrix 400) and element F2 in tile 16 (i.e., element F2 in matrix 405), and the product of element E3 in tile 0 (i.e., element E3 in matrix 400) and element F3 in tile 16 (i.e., element F3 in matrix 405). The output of the first set of operations for the convolution operation, $O_{00}$, is stored in the first row and first column of output matrix 455.

Figure 4D:
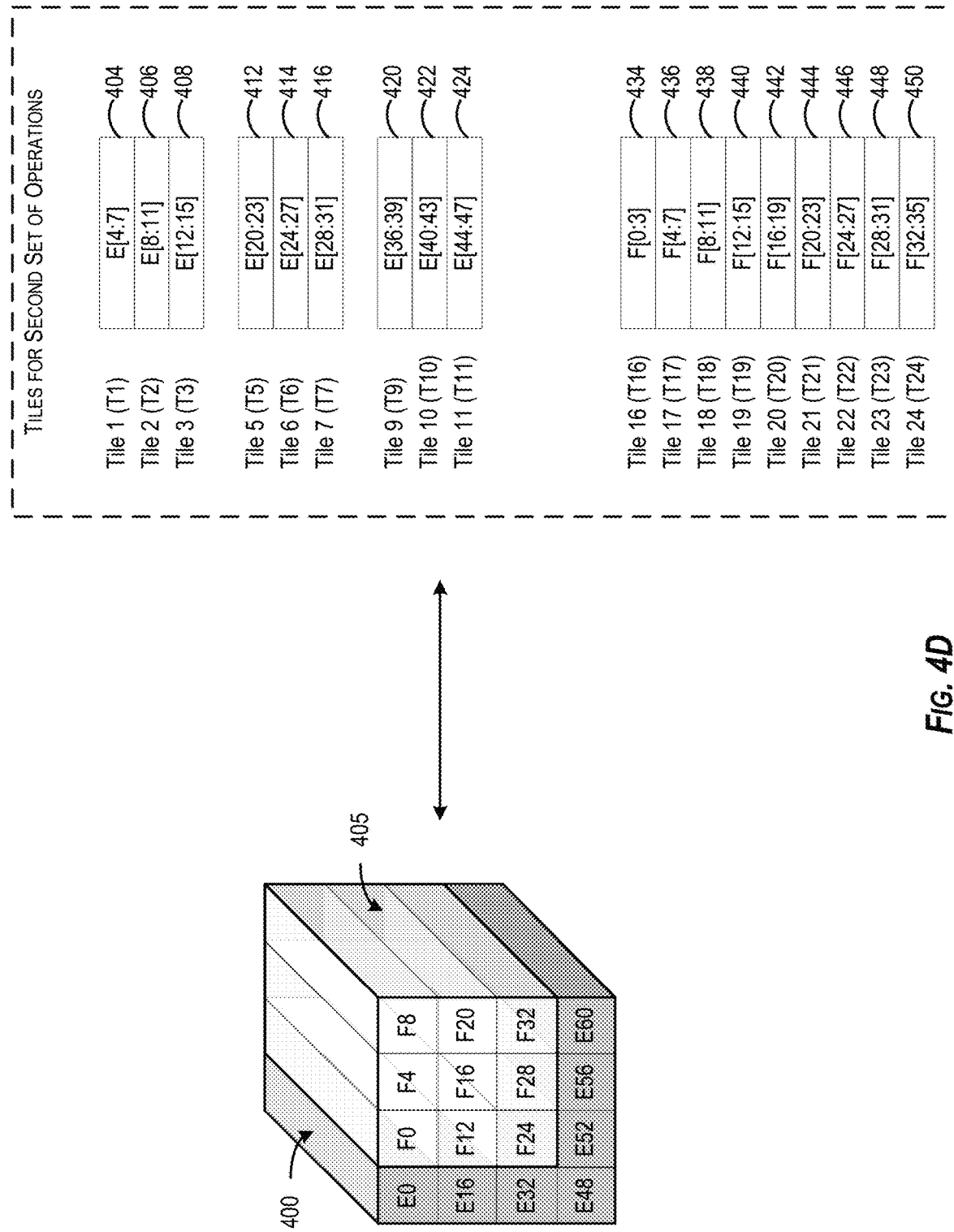

For the convolution operation in this example, the stride is 1. As such, the second set of matrix operations for the convolution operation is similar to the first set of operations except each element in matrix 405 is multiplied with a corresponding element in matrix 400 based on the positioning of matrices 400 and 405 shown in FIG. 4D. As shown, matrix 405 is shifted to the right by one element. Thus, element F0 in matrix 405 is multiplied with element E4 in matrix 400, element F1 in matrix 405 is multiplied with element E5 in matrix 400, element F2 in matrix 405 is multiplied with element E6 in matrix 405, etc. These products are added together. In addition, FIG. 4D shows the tiles of memory used in the second set of operations of the convolution operation. Here, the elements for matrix 400 used in the second set of operations are included in tiles of memory 404-408, 412-416, and 420-424 and the elements for matrix 405 are included in tiles of memory 434-450. Hardware system 110 (e.g., control engine 120) reads these tiles from memory for the second set of operations.

Figure 4E:
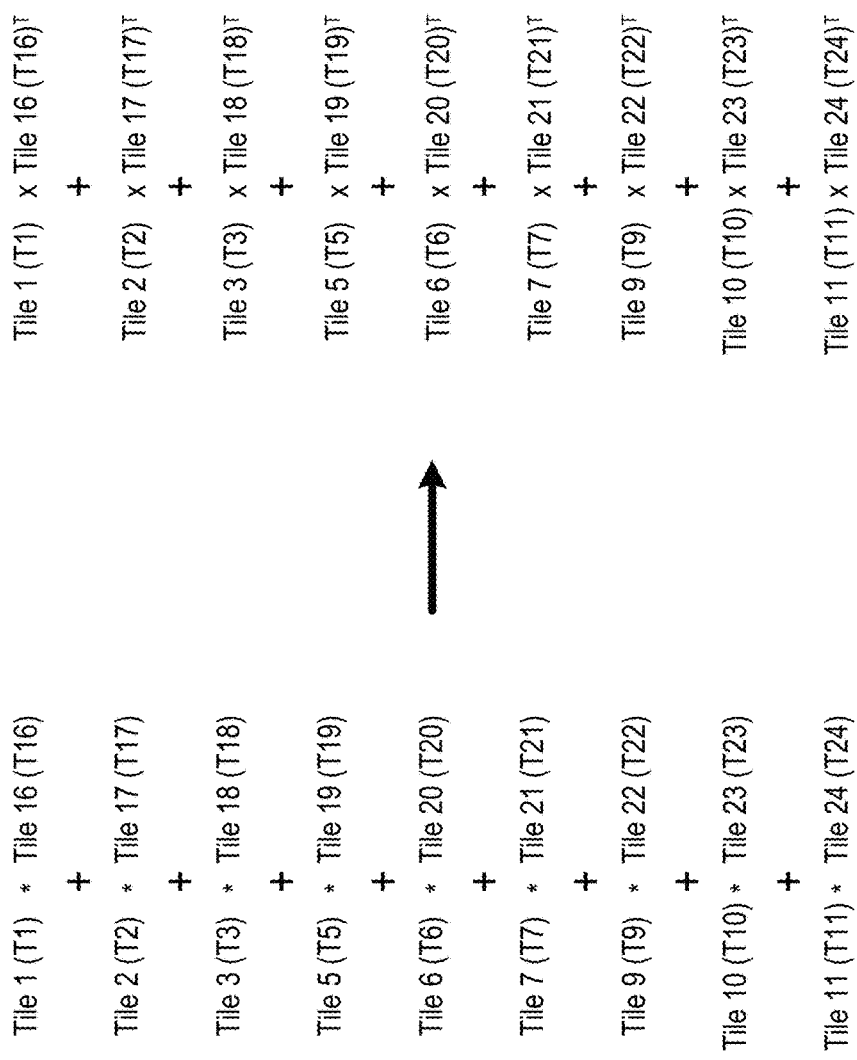

FIG. 4E illustrates the operations involved in the second set of operations for the convolution operation between matrices 400 and 405. As depicted on the left side of FIG. 4E, the second set of operations can be represented as the sum of the products of corresponding elements in matrices 400 and 405 explained above. Hardware system 110 implements the second set of operations in a similar fashion as the first set of operations. That is, hardware system 110 converts the sum of the products of corresponding elements in matrices 400 and 405 to a sum of matrix multiplication operations of the corresponding elements in matrices 400 and 405. Hardware system 110 does this by generating a transpose of the element in matrix 405 and performing a matrix multiplication between the corresponding element in matrix 400 and the transposed element from matrix 405 for each product of corresponding elements in matrices 400 and 405. The output of the second set of operations for the convolution operation, $O_{01}$, is stored in the first row and second column of output matrix 455.

Figure 4F:
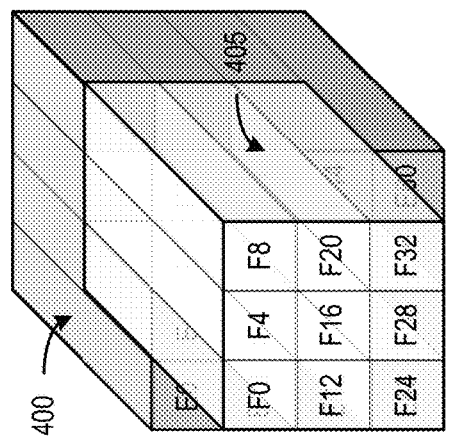

The third set of matrix operations for the convolution operation is similar to the first and second sets of operations except each element in matrix 405 is multiplied with a corresponding element in matrix 400 based on the positioning of matrices 400 and 405 shown in FIG. 4F. As mentioned above, the stride is 1 for the convolution operation in this example. Since matrix 405 has reached end of the row of matrix 400, matrix 405 is shifted down one row and back to the left side of matrix 400. As shown, element F0 in matrix 405 is multiplied with element E16 in matrix 400, element F1 in matrix 405 is multiplied with element E17 in matrix 400, element F2 in matrix 405 is multiplied with element E18 in matrix 405, etc. The products are then added together. FIG. 4F also shows the tiles of memory used in the third set of operations of the convolution operation. The elements for matrix 400 used in the third set of operations are included in tiles of memory 410-414, 418-422, and 426-430 and the elements for matrix 405 are included in tiles of memory 434-450. Hardware system 110 (e.g., control engine 120) reads these tiles from memory for the third set of operations.

Figure 4G:
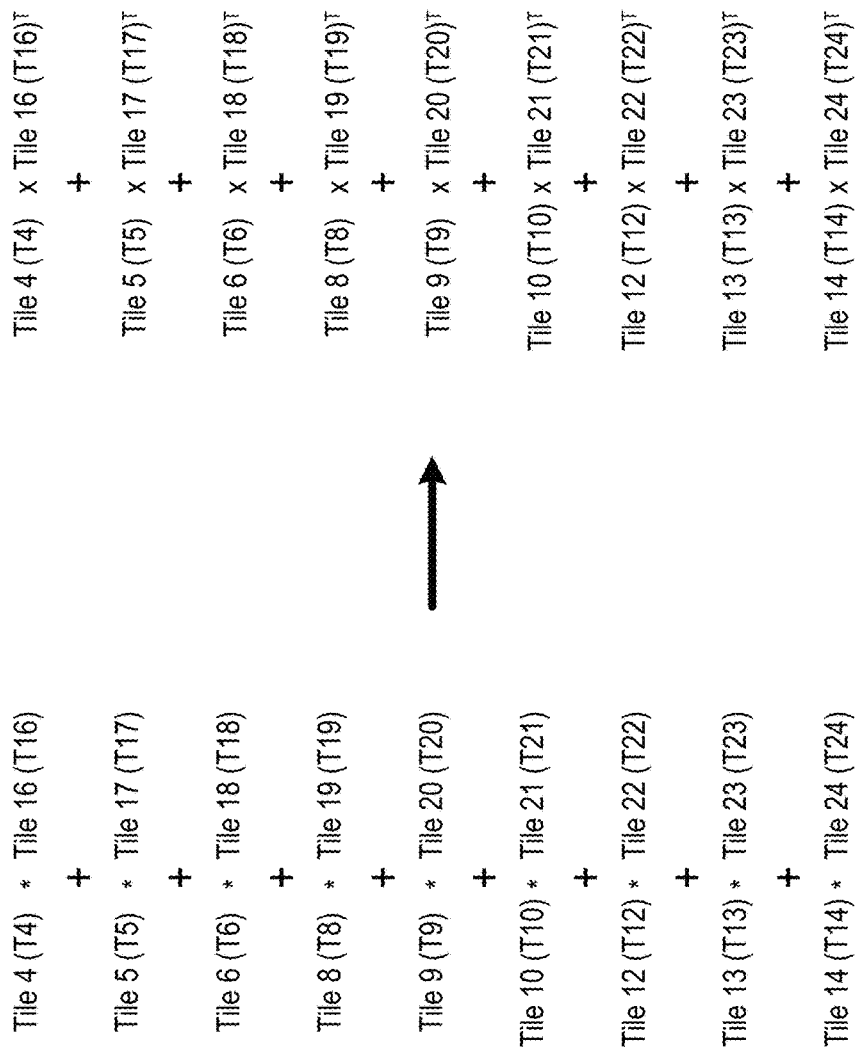

FIG. 4G illustrates the operations involved in the third set of operations for the convolution operation between matrices 400 and 405. As shown on the left side of FIG. 4G, the third set of operations can be represented as the sum of the products of corresponding elements in matrices 400 and 405 explained above. Hardware system 110 implements the third set of operations in a similar fashion as the first and second sets of operations. In particular, hardware system 110 converts the sum of the products of corresponding elements in matrices 400 and 405 to a sum of matrix multiplication operations of the corresponding elements in matrices 400 and 405. Hardware system 110 performs the conversion by generating a transpose of the element in matrix 405 and performing a matrix multiplication between the corresponding element in matrix 400 and the transposed element from matrix 405 for each product of corresponding elements in matrices 400 and 405. The output of the third set of operations for the convolution operation, $O_{10}$, is stored in the second row and first column of output matrix 455.

Figure 4H:
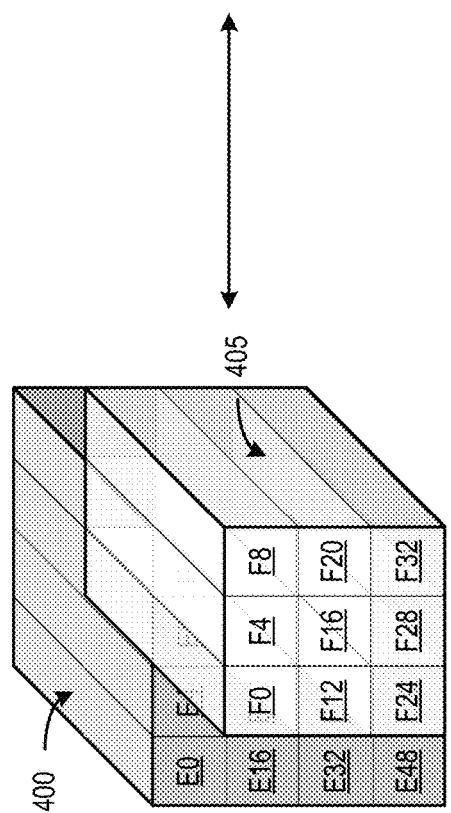

The fourth and final set of matrix operations for the convolution operation is similar to the first three sets of operations except each element in matrix 405 is multiplied with a corresponding element in matrix 400 based on the positioning of matrices 400 and 405 shown in FIG. 4H. Since the stride is 1 for the convolution operation in this example, matrix 405 is shifted to the right by on element. As illustrated in FIG. 4H, element F0 in matrix 405 is multiplied with element E20 in matrix 400, element F1 in matrix 405 is multiplied with element E21 in matrix 400, element F2 in matrix 405 is multiplied with element E22 in matrix 405, etc. These products are added together. Additionally, FIG. 4H shows the tiles of memory used in the third set of operations of the convolution operation. The elements for matrix 400 used in the third set of operations are included in tiles of memory 412-416, 420-424, and 428-432 and the elements for matrix 405 are included in tiles of memory 434-450. Hardware system 110 (e.g., control engine 120) reads these tiles from memory for the fourth set of operations.

Figure 4I:
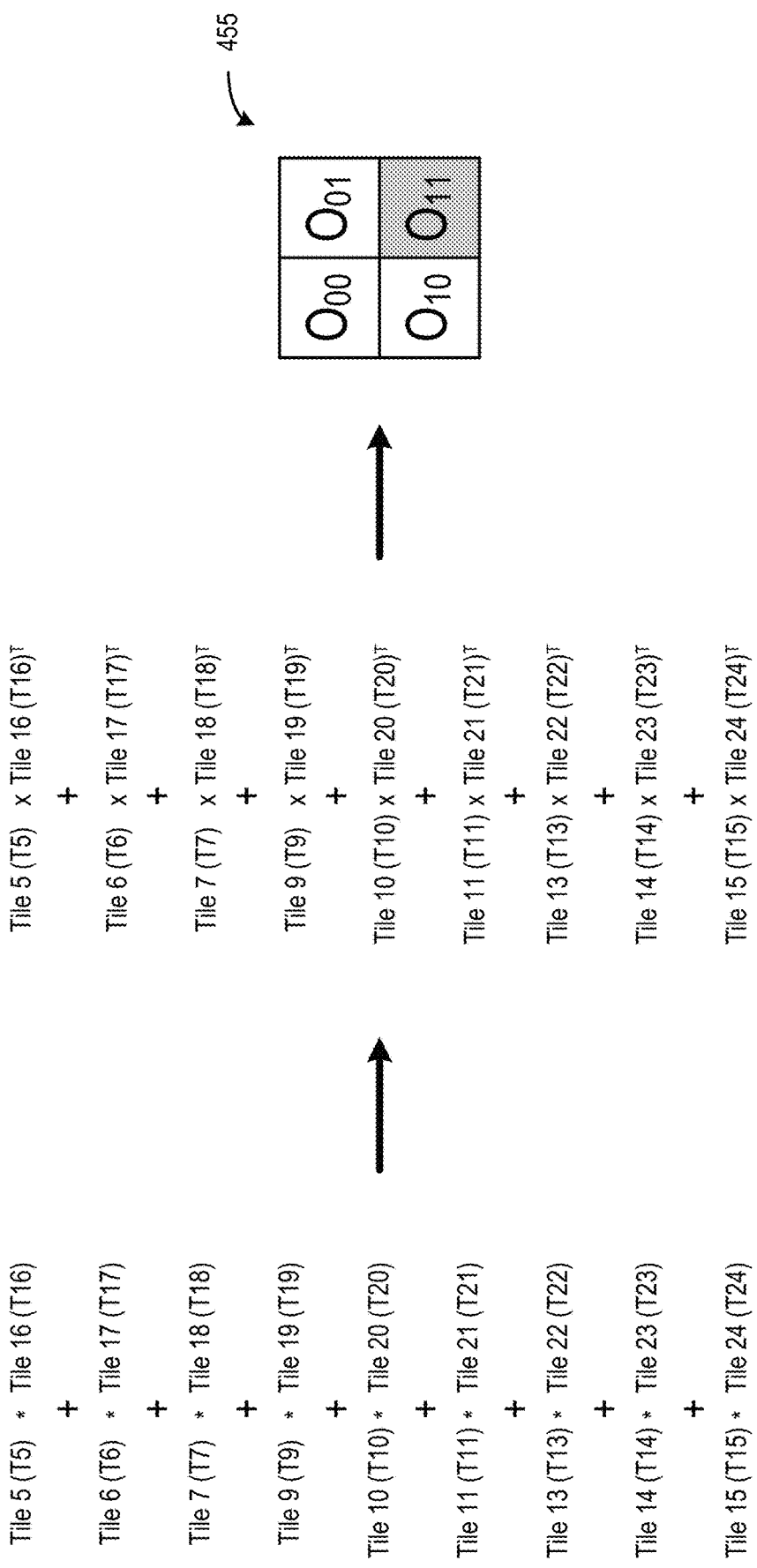

FIG. 4I illustrates the operations involved in the fourth set of operations for the convolution operation between matrices 400 and 405. As shown on the left side of FIG. 4I, the fourth set of operations can be represented as the sum of the products of corresponding elements in matrices 400 and 405 explained above. Hardware system 110 implements the third set of operations in a similar fashion as the first three sets of operations. That is, hardware system 110 converts the sum of the products of corresponding elements in matrices 400 and 405 to a sum of matrix multiplication operations of the corresponding elements in matrices 400 and 405. Hardware system 110 does the conversion by generating a transpose of the element in matrix 405 and performing a matrix multiplication between the corresponding element in matrix 400 and the transposed element from matrix 405 for each product of corresponding elements in matrices 400 and 405. The output of the fourth set of operations for the convolution operation, $O_{11}$, is stored in the second row and second column of output matrix 455.

Figure 5A:
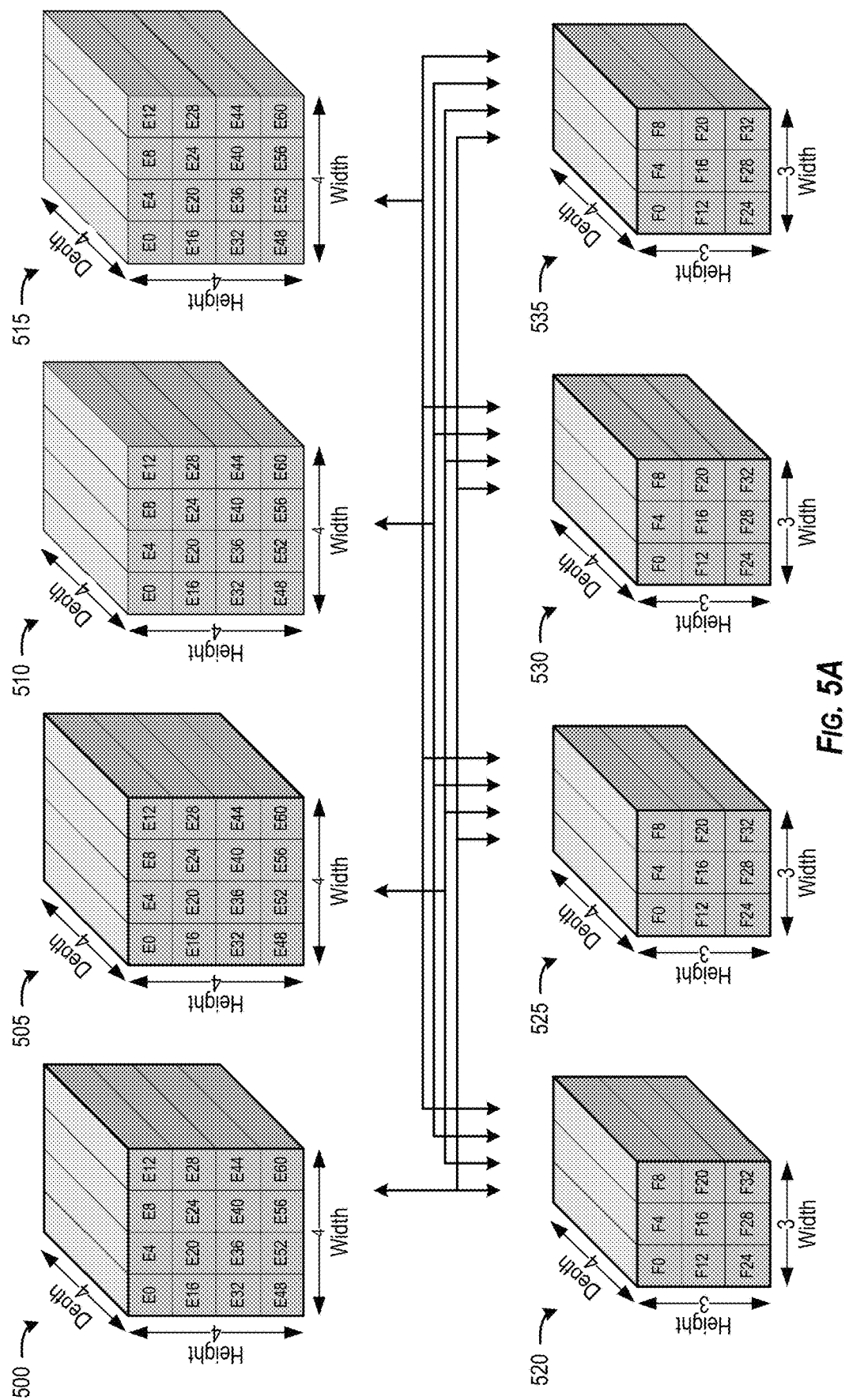

FIGS. 5A-5I illustrate example matrix operations performed in parallel on matrices stored in memory based on depth according to some embodiments. Specifically, FIGS. 5A-5I illustrate convolution operations performed between multiple pairs of matrices in parallel. For this example, eight matrices 500-535 will be used. As depicted in FIG. 5A, each of the four matrices 500-515 is a 3D matrix with a height of 4 (e.g., 4 rows), a width of 4 (e.g., 4 columns), and a depth of 4 (e.g., 4 layers). Each of the four matrices 520-535 is a 3D matrix with a height of 3 (e.g., 3 rows), a width of 3 (e.g., 3 columns), and a depth of 4 (e.g., 4 layers). In this example, convolution operations will be performed between matrix 500 and each of the matrices 520-535, between matrix 505 and each of the matrices 520-535, between matrix 510 and each of the matrices 520-535, and between matrix 515 and each of the matrices 520-535. In total, sixteen convolution operations will be performed between sixteen pairs of matrices.

Figure 5B:
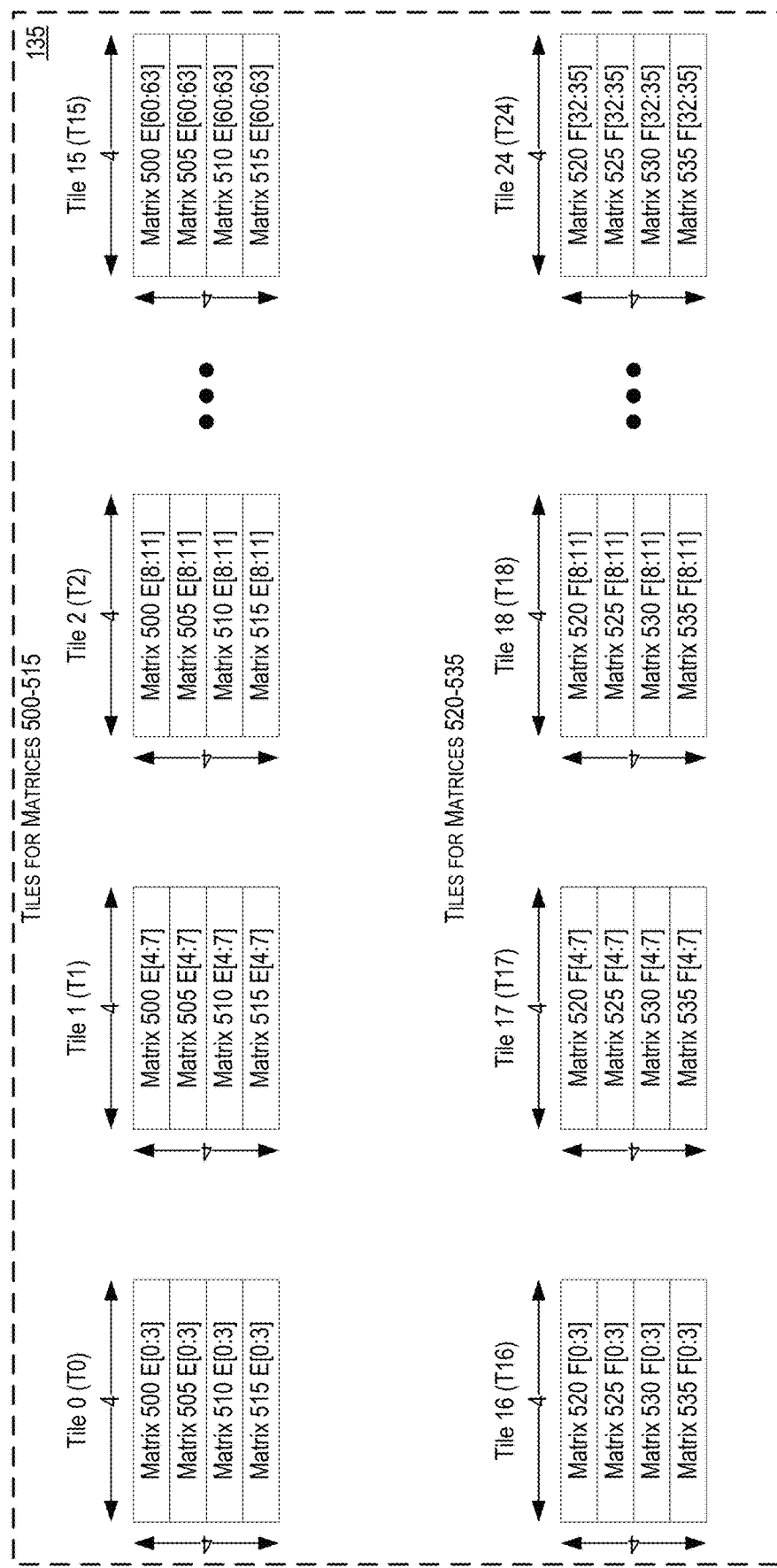

For this example, the techniques for storing several matrices in memory based on depth shown in FIGS. 3A-3D are used to store matrices 500-515 together and matrices 520-535 together. FIG. 5B illustrates the tiles of memory used to store matrices 500-535. In this example, each tile of memory is configured to store sixteen elements. As shown in FIG. 5B, tiles of memory tiles 0-15 (T0-15), which are stored in memory 135, store the elements of matrices 500-515. Tiles of memory 16-24 (T16-24), which are also stored in memory 135, store the elements of matrices 520-535.

Figure 5C:
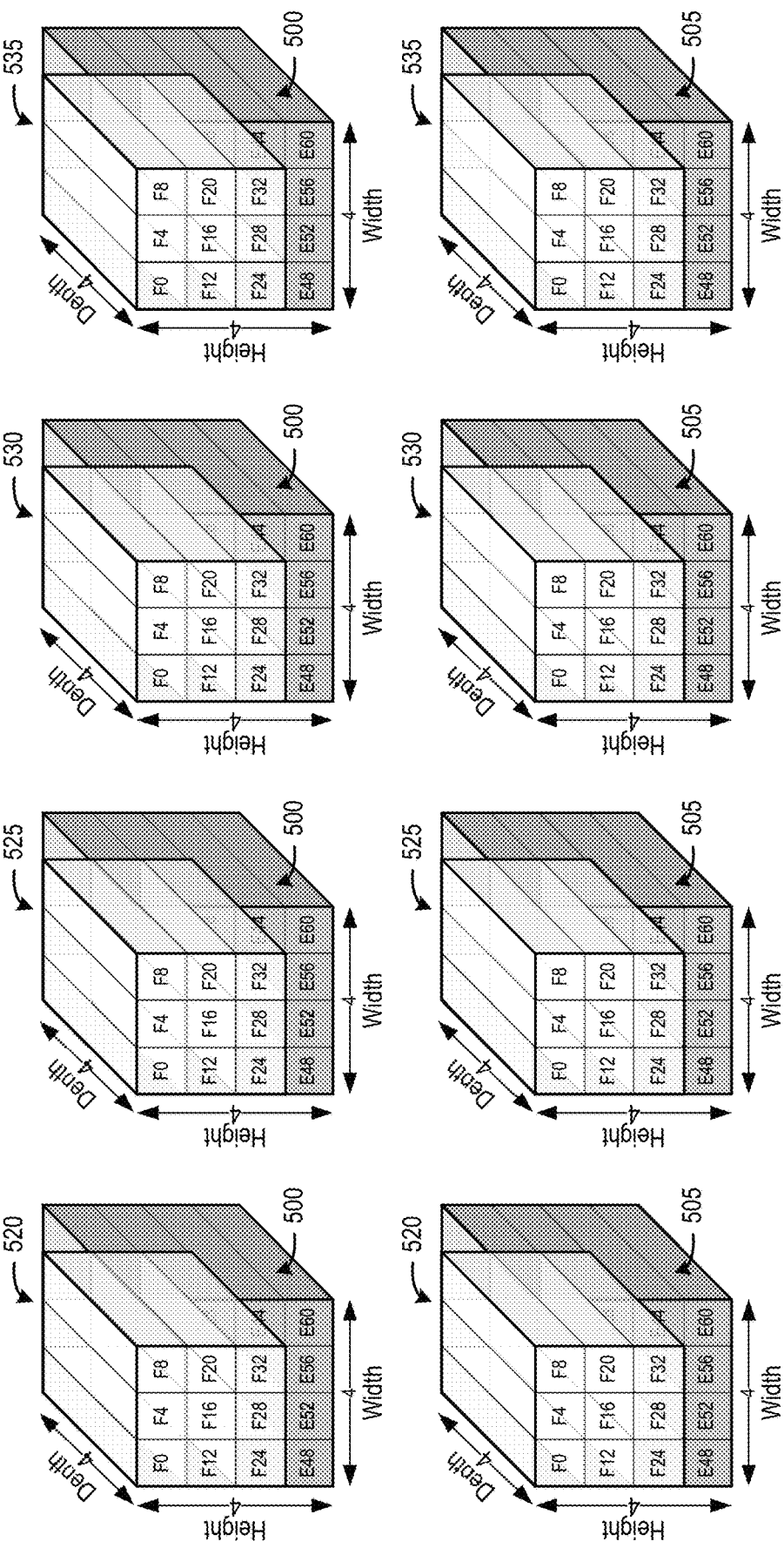
Figure 5D:
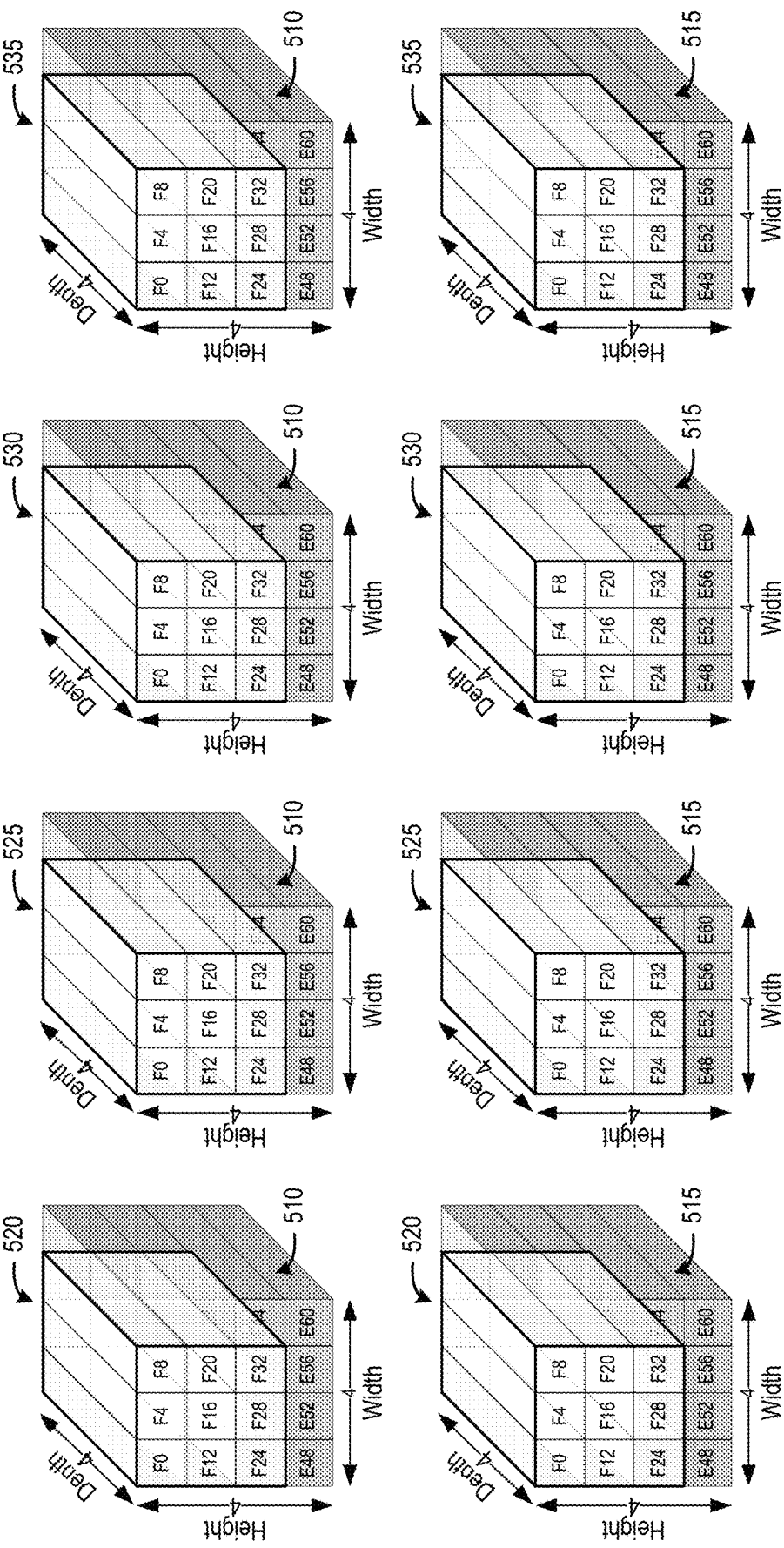

FIGS. 5C and 5D illustrate the first set of operations for the sixteen convolution operations. In particular, FIG. 5C shows the first set of operations for convolution operations between matrix 500 and each of the matrices 520-535 as well as the first set of operations for convolution operations between matrix 505 and each of the matrices 520-535. FIG. 5D depicts the first set of operations for convolution operations between matrix 510 and each of the matrices 520-535 and the first set of operations for convolution operations between matrix 515 and each of the matrices 520-535.

In the first set of operations for each of these convolution operations, each element in one of the matrices is multiplied with a corresponding element in the other matrix based on the positioning of matrices illustrated in FIGS. 5C and 5D. For instance, element F0 in the smaller matrix (e.g., matrix 520, matrix 525, matrix 530, or matrix 535) is multiplied with element E0 in the larger matrix (e.g., matrix 500, matrix 505, matrix 510, or matrix 515), element F1 in the smaller matrix is multiplied with element E1 in the larger matrix, element F2 in the smaller matrix is multiplied with element E2 in the larger matrix, etc. The products for each convolution operation are then added together.

Figure 5E:
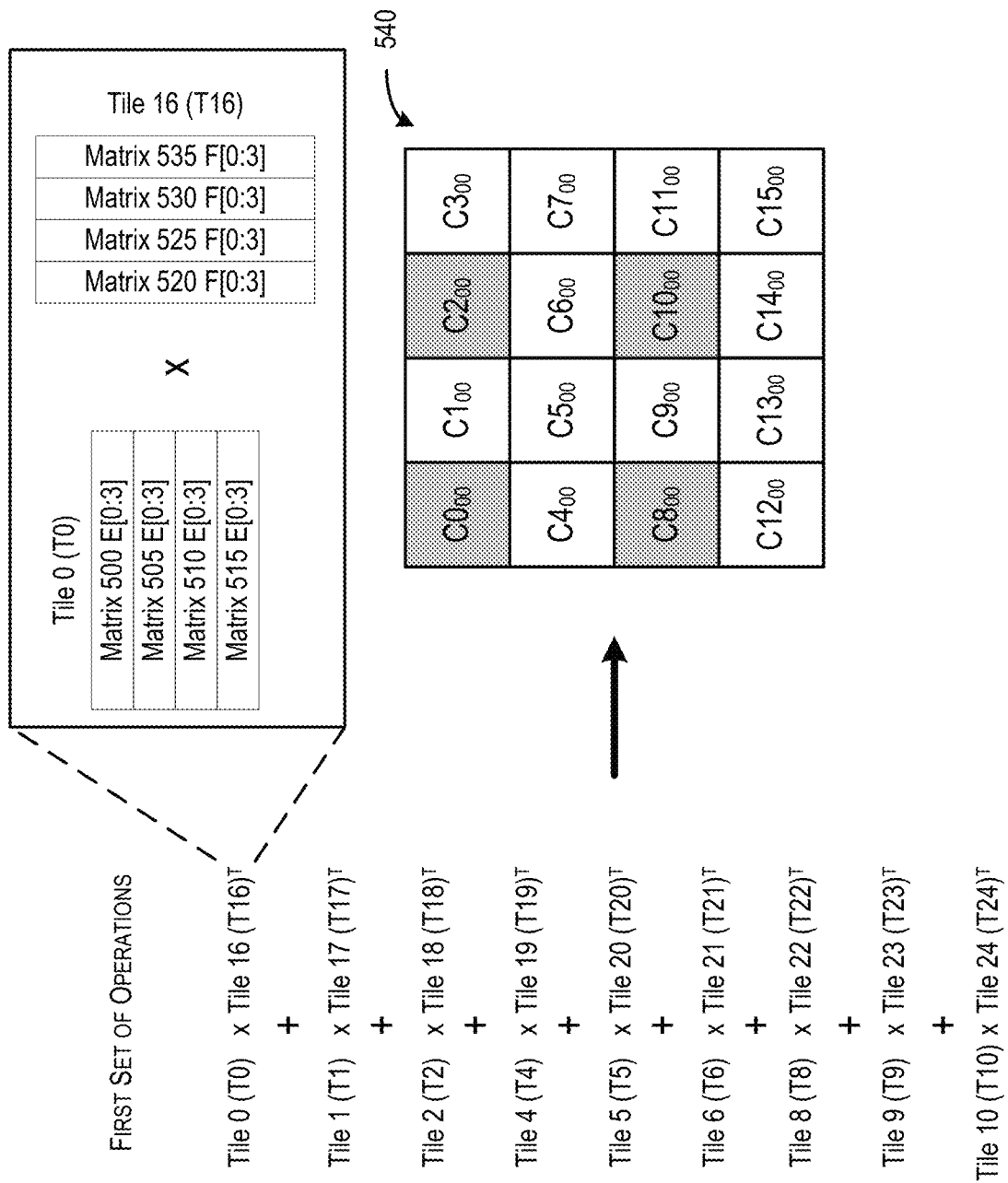

FIG. 5E illustrates the tiles of memory used in the first set of operations for the sixteen convolution operations. Here, tiles of memory 0-2, 4-6, and 8-10, which store the elements of matrices 500-515, and tiles of memory 16-24, which store the elements of matrices 520-535, are used in the first set of operations for the sixteen convolution operations. Hardware system 110 (e.g., control engine 120) reads these tiles from memory for the first set of operations.

FIG. 5E also illustrates the operations involved in the first set of operations for the sixteen convolution operations. The first set of operations for each convolution operation shown in FIGS. 5C and 5D may be represented as the sum of products of corresponding elements in the matrices. As depicted in FIG. 5E, hardware system 110 can perform the first set of operations for the sixteen convolution operations in parallel by generating a transpose of tiles of memory storing elements of the smaller matrices (e.g., matrix 520, matrix 525, matrix 530, and matrix 535), performing a matrix multiplication operation between the corresponding tiles of memory storing elements of the larger matrices (e.g., matrix 500, matrix 505, matrix 510, and matrix 515) and the transposed of tiles of memory storing elements of the smaller matrices, and adding the outputs of the matrix multiplication operations together. The output of each matrix multiplication operation is a 4×4 matrix. The outputs of the matrix multiplication operation are added together to form output matrix 540. Each element in output matrix 540 is the first convolution output for each convolution operation. For example, $C0_{00}$ is the first convolution output for the convolution operation between matrices 500 and 520, $C1_{00}$ is the first convolution output for the convolution operation between matrices 500 and 525, $C2_{00}$ is the first convolution output for the convolution operation between matrices 500 and 530, $C3_{00}$ is the first convolution output for the convolution operation between matrices 500 and 530, $C4_{00}$ is the first convolution output for the convolution operation between matrices 505 and 520, $C5_{00}$ is the first convolution output for the convolution operation between matrices 505 and 525, etc.

The sixteen convolution operations in this example each has a stride of 1. Thus, the second set of matrix operations for the sixteen convolution operations is similar to the first set of operations except the smaller matrices are shifted to the right by one element. Each element in the smaller matrices is multiplied with a corresponding element in a larger matrix based on these positions of the matrices (e.g., the position of matrices 400 and 405 shown in FIG. 4D). The products for each convolution operation are added together.

Figure 5F:
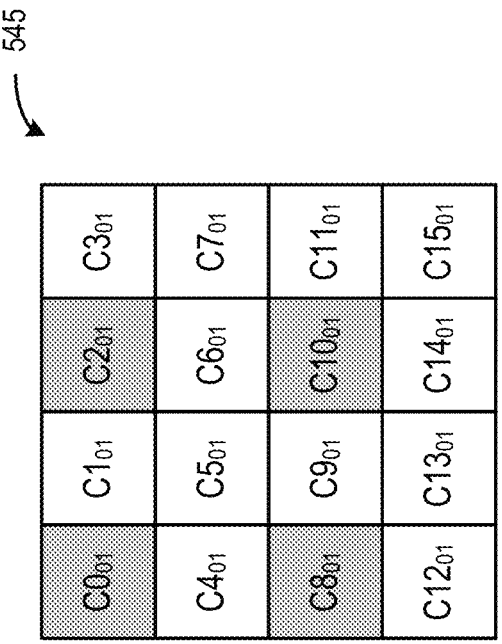

FIG. 5F illustrates the tiles of memory used in the second set of operations for the sixteen convolution operations. As shown in FIG. 5F, tiles of memory 1-3, 5-7, and 9-11, which store the elements of matrices 500-515, and tiles of memory 16-24, which store the elements of matrices 520-535, are used in the second set of operations for the sixteen convolution operations. Hardware system 110 (e.g., control engine 120) reads these tiles from memory for the second set of operations.

Additionally, FIG. 5F illustrates the operations involved in the second set of operations for the sixteen convolution operations. The second set of operations for each convolution operation can be represented as the sum of products of corresponding elements in the matrices. As shown in FIG. 5F, hardware system 110 may perform the second set of operations for the sixteen convolution operations in parallel by generating a transpose of tiles of memory storing elements of the smaller matrices (e.g., matrix 520, matrix 525, matrix 530, and matrix 535), performing a matrix multiplication operation between the corresponding tiles of memory storing elements of the larger matrices (e.g., matrix 500, matrix 505, matrix 510, and matrix 515) and the transposed of tiles of memory storing elements of the smaller matrices, and adding the outputs of the matrix multiplication operations together. The output of each matrix multiplication operation is a 4×4 matrix. These outputs are added together to form output matrix 545. Each element in output matrix 545 is the second convolution output for each convolution operation. For instance, $C0_{01}$ is the second convolution output for the convolution operation between matrices 500 and 520, $C1_{01}$ is the second convolution output for the convolution operation between matrices 500 and 525, $C2_{01}$ is the second convolution output for the convolution operation between matrices 500 and 530, $C3_{01}$ is the second convolution output for the convolution operation between matrices 500 and 530, $C4_{01}$ is the second convolution output for the convolution operation between matrices 505 and 520, $C5_{01}$ is the second convolution output for the convolution operation between matrices 505 and 525, etc.

As mentioned above, a stride of 1 is being used for the sixteen convolution operations in this example. As the smaller matrices have reached end of the rows of the larger matrices, the smaller matrices are shifted down one row and back to the left side of the respective larger matrices. Accordingly, the third set of matrix operations for the sixteen convolution operations is similar to the first set of operations except the smaller matrices are shifted down one row. Each element in the smaller matrices is multiplied with a corresponding element in a larger matrix based on these positions of the matrices (e.g., the position of matrices 400 and 405 shown in FIG. 4F). The products for each convolution operation are added together.

Figure 5G:
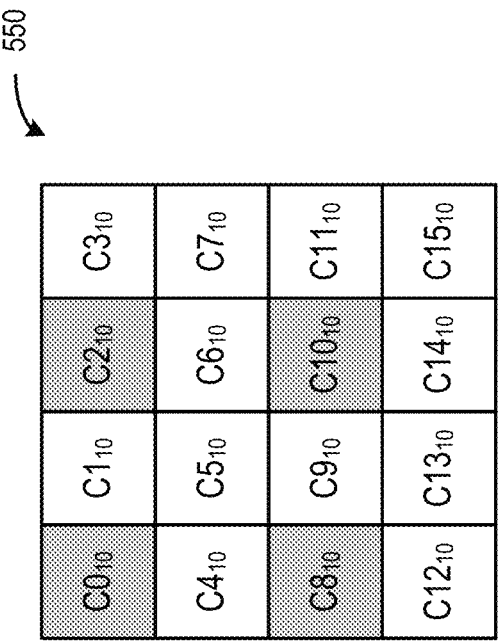

FIG. 5G illustrates the tiles of memory used in the third set of operations for the sixteen convolution operations. As depicted in FIG. 5G, tiles of memory 4-6, 8-10, and 12-14, which store the elements of matrices 500-515, and tiles of memory 16-24, which store the elements of matrices 520-535, are used in the third set of operations for the sixteen convolution operations. Hardware system 110 (e.g., control engine 120) reads these tiles from memory for the third set of operations.

FIG. 5G also illustrates the operations involved in the third set of operations for the sixteen convolution operations. The third set of operations for each convolution operation may be represented as the sum of products of corresponding elements in the matrices. As illustrated in FIG. 5G, hardware system 110 can perform the third set of operations for the sixteen convolution operations in parallel by generating a transpose of tiles of memory storing elements of the smaller matrices (e.g., matrix 520, matrix 525, matrix 530, and matrix 535), performing a matrix multiplication operation between the corresponding tiles of memory storing elements of the larger matrices (e.g., matrix 500, matrix 505, matrix 510, and matrix 515) and the transposed of tiles of memory storing elements of the smaller matrices, and adding the outputs of the matrix multiplication operations together. The output of each matrix multiplication operation is a 4×4 matrix, which are added together to form output matrix 550. Each element in output matrix 550 is the third convolution output for each convolution operation. For example, $C0_{10}$ is the third convolution output for the convolution operation between matrices 500 and 520, $C1_{10}$ is the third convolution output for the convolution operation between matrices 500 and 525, $C2_{10}$ is the third convolution output for the convolution operation between matrices 500 and 530, $C3_{10}$ is the third convolution output for the convolution operation between matrices 500 and 530, $C4_{10}$ is the third convolution output for the convolution operation between matrices 505 and 520, $C5_{10}$ is the third convolution output for the convolution operation between matrices 505 and 525, etc.

Using a stride of 1 for the sixteen convolution operations in this example, the smaller matrices are now shifted to the right by one element. Therefore, the fourth set of matrix operations for the sixteen convolution operations is similar to the third set of operations except the smaller matrices are shifted to the right by one element. Each element in the smaller matrices is multiplied with a corresponding element in a larger matrix based on these positions of the matrices (e.g., the position of matrices 400 and 405 shown in FIG. 4H). The products for each convolution operation are then added together.

Figure 5H:
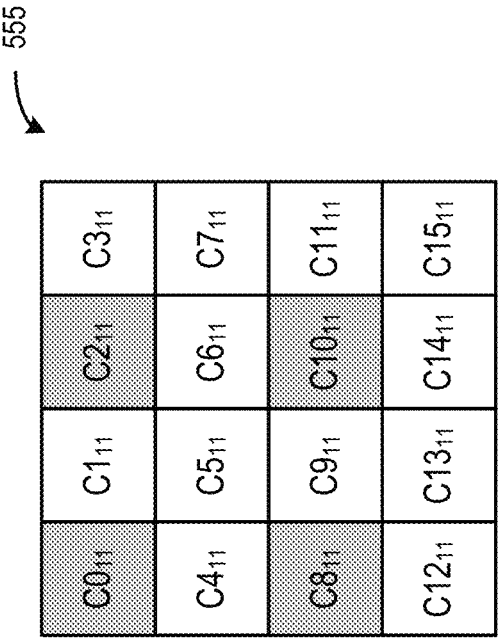

FIG. 5H illustrates the tiles of memory used in the fourth set of operations for the sixteen convolution operations. As shown in FIG. 5H, tiles of memory 5-7, 9-11, and 13-15, which store the elements of matrices 500-515, and tiles of memory 16-24, which store the elements of matrices 520-535, are used in the fourth set of operations for the sixteen convolution operations. Hardware system 110 (e.g., control engine 120) reads the tiles from memory for the fourth set of operations.

In addition, FIG. 5H illustrates the operations involved in the fourth set of operations for the sixteen convolution operations. The fourth set of operations for each convolution operation can be represented as the sum of products of corresponding elements in the matrices. As shown in FIG. 5H, hardware system may can perform the fourth set of operations for the sixteen convolution operations in parallel by generating a transpose of tiles of memory storing elements of the smaller matrices (e.g., matrix 520, matrix 525, matrix 530, and matrix 535), performing a matrix multiplication operation between the corresponding tiles of memory storing elements of the larger matrices (e.g., matrix 500, matrix 505, matrix 510, and matrix 515) and the transposed of tiles of memory storing elements of the smaller matrices, and adding the outputs of the matrix multiplication operations together. The output of each matrix multiplication operation is a 4×4 matrix. These outputs are added together to form output matrix 555. Each element in output matrix 555 is the fourth convolution output for each convolution operation. For instance, $C0_{11}$ is the fourth convolution output for the convolution operation between matrices 500 and 520, $C1_{11}$ is the fourth convolution output for the convolution operation between matrices 500 and 525, $C2_{11}$ is the fourth convolution output for the convolution operation between matrices 500 and 530, $C3_{11}$ is the fourth convolution output for the convolution operation between matrices 500 and 530, $C4_{11}$ is the fourth convolution output for the convolution operation between matrices 505 and 520, $C5_{11}$ is the fourth convolution output for the convolution operation between matrices 505 and 525, etc.

The fourth set of operations is the last set of operations performed for the sixteen convolution operations. FIG. 5I illustrates output matrices 560-590 for the sixteen convolution operation. Specifically, FIG. 5I illustrates the individual output matrices for each of the sixteen convolution operations. In some embodiments, output matrices 560-590 can be stored together using a depth-based approach like the example described above by reference to FIGS. 3A-3D. The elements in output matrices 560-590 are formed from the respective elements in output matrices 545-555. For example, output matrix 560 is the output from the convolution operation between matrix 500 and matrix 520. The first convolution output $C0_{00}$ is from output matrix 540, the second convolution output $C0_{01}$ is from output matrix 545, the third convolution output $C0_{10}$ is from output matrix 550, and the fourth convolution output $C0_{11}$ is from output matrix 555.

Figure 6:
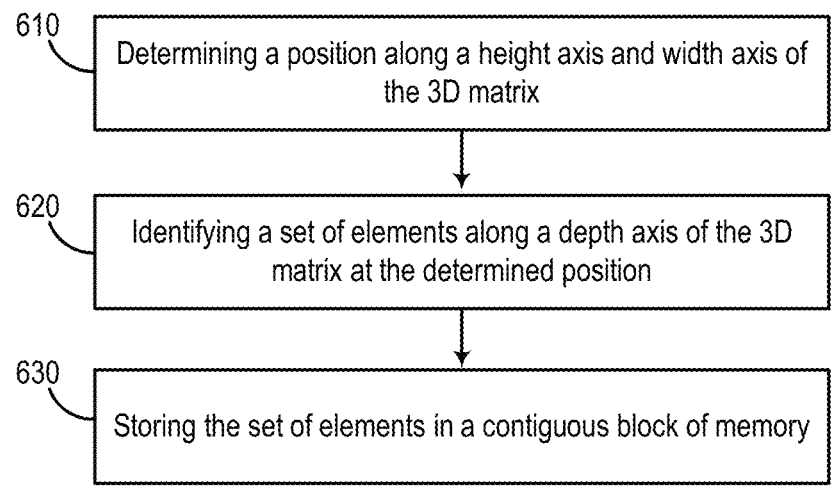
FIG. 6 illustrates a process for storing a matrix in memory based on depth according to some embodiments.

FIG. 6 illustrates a process 600 for storing a matrix in memory based on depth according to some embodiments. In some embodiments, memory manager 140 performs process 600. Process 600 begins by determining, at 610, a position along a height axis and width axis of a 3D matrix. Referring to FIGS. 1 and 2B as an example, memory manager 140 determines the location at the first row and first column of matrix 200.

Next, process 600 identifies, at 620, a set of elements along a depth axis of the 3D matrix at the determined position. Referring to FIGS. 1 and 2B as an example, memory manager 140 identifies the first four elements along the depth axis (i.e., the elements in the first four layers at the first row and first column of matrix 200).

Finally, process 600 stores, at 630, the set of elements in a contiguous block of memory. Referring to FIGS. 1 and 2B as an example, memory manager 140 stores the identified elements from matrix 200 in tile of memory 205, which is a contiguous block of memory stored in memory 135. Process 600 performs operations 610-630 for each of a plurality of sets of elements in a three-dimensional (3D) matrix. For instance, referring to FIGS. 2C-2E as an example, process 600 iterates through the sets of elements in matrix 200 in the manner shown in FIGS. 2C-2E and stores them in tiles of memory 210-220.

II. Programmable Control Engine

As explained above, described in this application are techniques for performing tensor operations using a programmable control engine. The following FIGS. 7-14 will show several examples and embodiments directed at these techniques. The matrix operations used in the examples and embodiments described above in section I can be executed using the techniques described in this section for the programmable control engine. As mentioned above, configuration registers can include several sets of configuration registers. Each set of configuration registers includes a set of configuration parameters. One type of command that control engine 120 processes is a command for setting a value for a parameter in a set of configuration registers.

Figure 7:
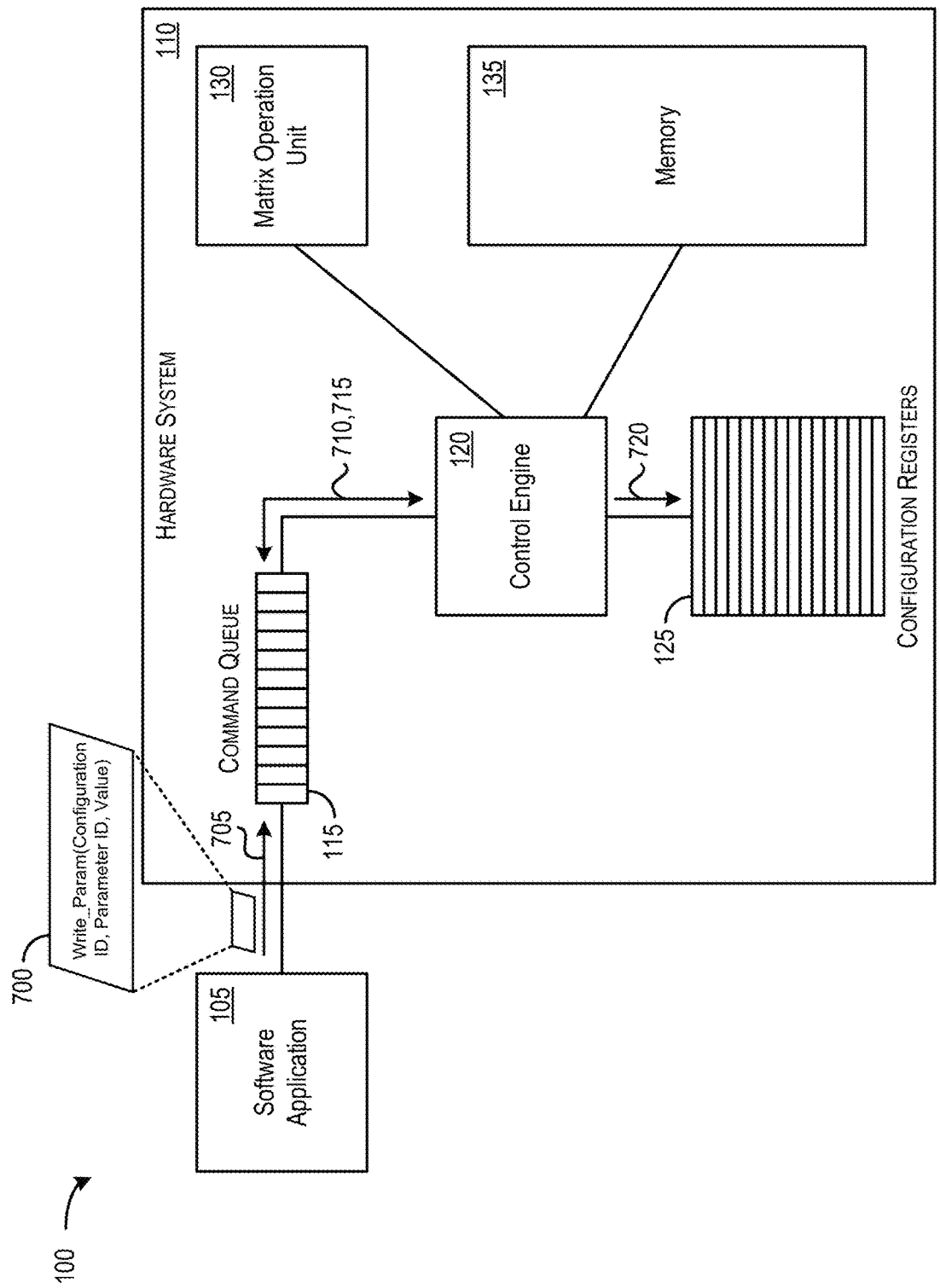
FIG. 7 illustrates a data flow through the system illustrated in FIG. 1 for a command to set a value for a parameter in a set of configuration registers according to some embodiments.

FIG. 7 illustrates a data flow through system 100 for a command to set a value for a parameter in a set of configuration registers according to some embodiments. In this example, command queue 115 is empty (i.e., it does not have any commands in its queue). The data flow starts by software application 105 sending, at 705, command 700 to command queue 115 of hardware system 110. As shown, command 700 is a write parameter command that includes a configuration identifier (ID), a parameter ID, and a value. The configuration ID is for identifying a set of configuration registers in configuration registers 125. The parameter ID is for identifying a parameter in the set of configuration registers. The value is for the parameter in the set of configuration registers.

When command queue 115 receives command 700, it stores command 700 in its queue. Next, control engine 120 sends, at 710, command queue 115 a request for a command. Since command 700 is the only command stored in command queue 115's queue, command queue 115 removes command 700 from its queue and sends, at 715, it to control engine 120. Once control engine 120 receives command 700, control engine 120 determines that command 700 is a write parameter command. Hence, control engine 120 identifies a parameter in a set of configuration registers in configuration registers 125 based on the configuration ID and the parameter ID specified in command 700. Then, control engine 120 writes, at 720, the value specified in command 700 for the identified parameter in the identified set of configuration registers in configuration registers 125.

As demonstrated by the example shown in FIG. 7, write parameter commands allow values to be set for parameters in the sets of configuration registers in configuration registers 125. With multiple sets of configuration registers that can each be programmed differently, control engine 120 can use different configurations to perform different operations. Moreover, control engine 120 can use the same configuration multiple times to perform the same operation on different data.

Figure 8:
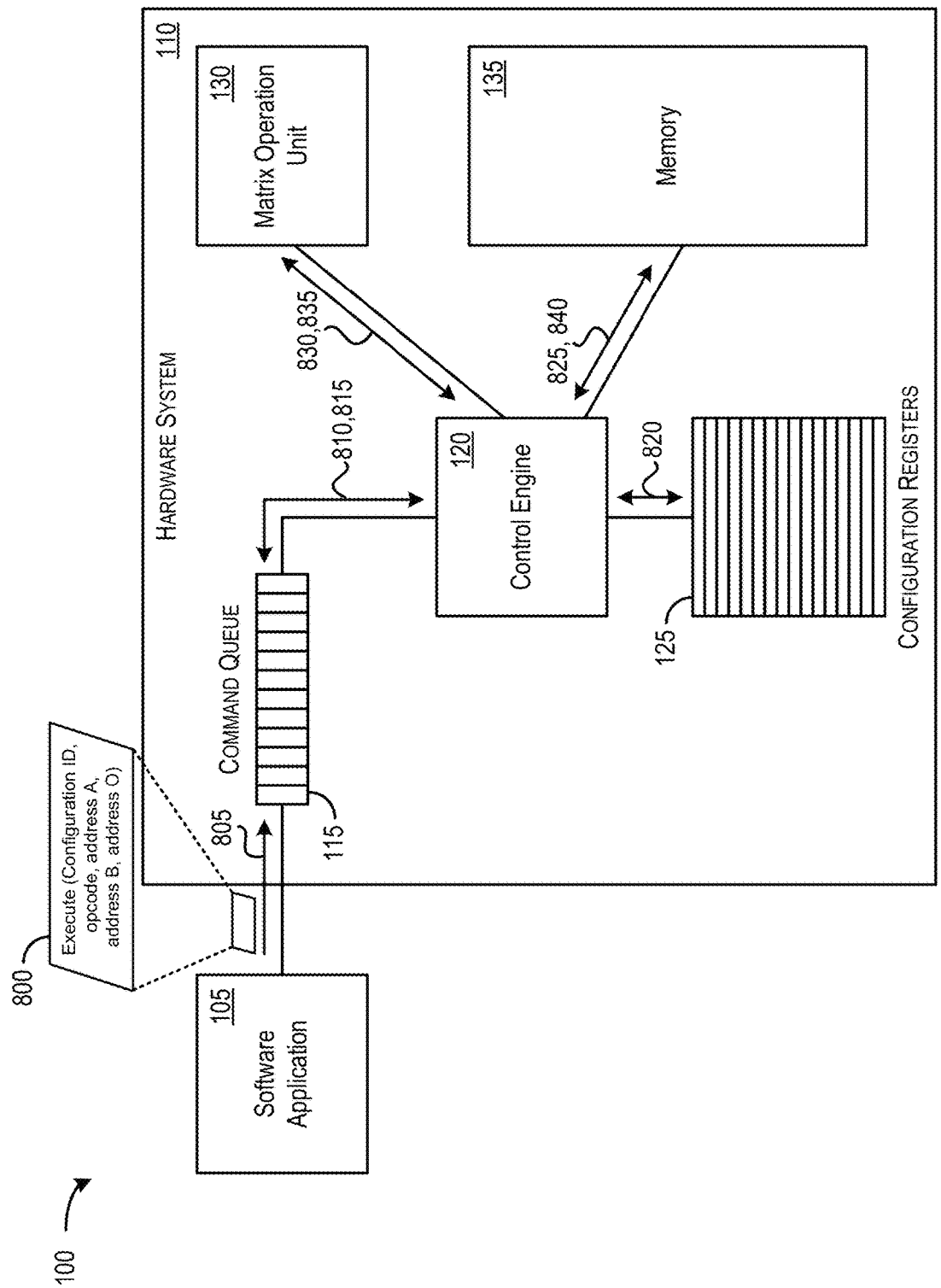
FIG. 8 illustrates a data flow through the system illustrated in FIG. 1 for a command to execute matrix operations on matrices according to some embodiments.

In addition to write parameter commands, control engine 120 can process commands for executing matrix operations on matrices. FIG. 8 illustrates a data flow through system 100 for a command to execute matrix operations on matrices according to some embodiments. For this example, command queue 115 is empty (i.e., it does not have any commands in its queue). The data flow begins by software application 105 sending, at 805, command 800 to command queue 115 of hardware system 110. As illustrated in FIG. 8, command 800 is a execute command that includes a configuration ID, an operation code (opcode), an address A, an address B, and an address O. The configuration ID is for identifying a set of configuration registers in configuration registers 125. The operation code specifies a particular operation to perform. The address A is a memory address (e.g., a memory offset) from which an input operand A is read. The address B is a memory address (e.g., a memory offset) from which an input operand B is read. The address O is a memory address (e.g., a memory offset) to which an output O is written.

After command queue 115 receives command 800, it stores command 800 in its queue. Control engine 120 then sends, at 810, command queue 115 a request for a command. In this example, command 800 is the only command stored in the queue of command queue 115. Therefore, command queue 115 removes command 800 from its queue and sends, at 815, command 800 to control engine 120. Upon receiving command 800, control engine 120 determines that command 800 is an execute command. Thus, control engine 120 retrieves, at 820, a set of configuration registers in configuration registers 125 based on the configuration ID specified in command 800. Using the values of the set of parameters in the identified set of configuration registers, control engine 120 executes the operation specified by the operation code in command 800 by reading input data from memory 135 based on the addresses A and B specified in command 800. Control engine 120 writes output data to memory 135 based on the address O.

To execute the operation specified in command 800, control engine 120 can utilize MOU 130 to perform matrix multiplication operations. For example, control engine 120 may read, at 825, input data from memory 135. Then, control engine 120 can send, at 830 input data to MOU 130 and instruct it to execute a matrix multiplication operation on the input data. When control engine 120 receives, at 835, output data generated by MOU 130, control engine 120 can store, at 840, the output data in memory 135. Control engine 120 may use MOU 130 as necessary to execute the operation specified in command 800.

In some cases where a matrix operation is to be performed on two input matrices, memory 135 may have enough free memory to store all the elements of the first input matrix, but not all the elements of the second input matrix (e.g., memory 135 does not have a contiguous block of memory large enough to store the second input matrix). In some such cases, the second input matrix is split up and matrix suboperations are performed on the first input matrix and each of the portions of the second input matrix. In such scenarios, control engine 110 may be programmed to intelligently write the outputs of the matrix suboperation so that the elements of the output of the original matrix operation are stored contiguously in memory.

Figure 9A:
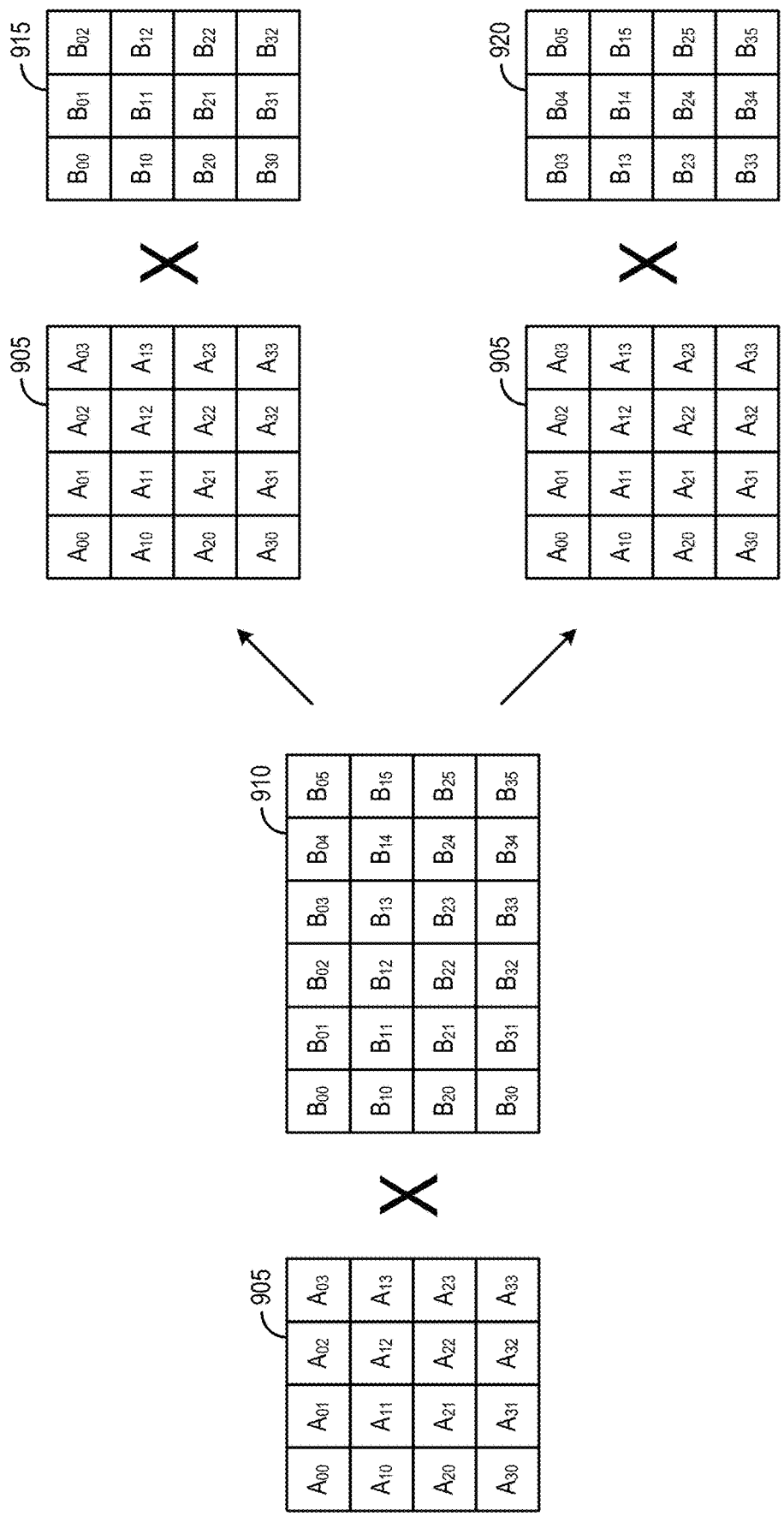
FIGS. 9A and 9B illustrate an example of split matrix operations according to some embodiments.
Figure 9B:
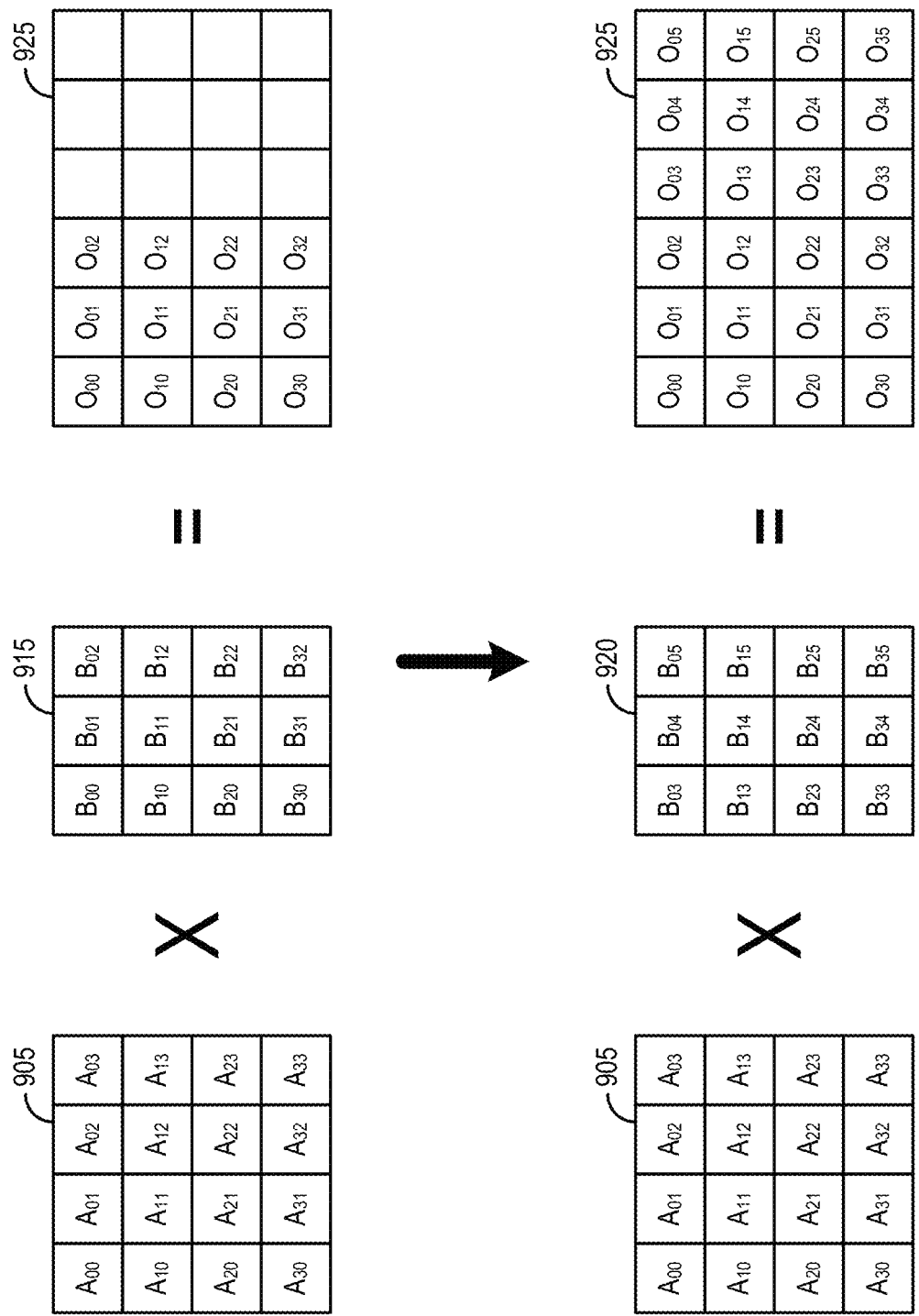

FIGS. 9A and 9B illustrate an example of split matrix operations according to some embodiments. FIG. 9A illustrates first input matrix 905 and second input matrix 910. In this example, a matrix multiplication operation is performed on first input matrix 905 and second input matrix 910. However, the entire second input matrix 910 does not fit in memory 135 (e.g., memory 135 does not have a contiguous block of memory large enough to store all the elements of second input matrix 910. As a result, second input matrix 910 is split into submatrices 915 and 920. Specifically, second input matrix 910 is vertically divided in half. Submatrix 915 is the left half of second input matrix 910 and submatrix 920 is the right half of second input matrix 910. As shown in FIG. 9A, the matrix multiplication operation on first input matrix 905 and second input matrix 910 is split into two matrix multiplication suboperations. In particular, a first matrix multiplication suboperation is performed on first input matrix 905 and submatrix 915 and a second matrix multiplication suboperation is performed on first input matrix 905 and submatrix 920.

FIG. 9B illustrates the output generated by each suboperation. Output matrix 925 is generated from the first matrix multiplication suboperation on first input matrix 905 and submatrix 915, as shown in the top half of FIG. 9B. The execute command that software application 105 sends to hardware system 110 for the first suboperation includes a configuration ID of the set of configuration registers in configuration registers 125 to use for this command, an opcode indicating a matrix multiplication operation, the memory address in memory 135 from which first input matrix 905 is to be read, the memory address in memory 135 from which submatrix 915 is to be read, and the memory address in memory 135 to which output matrix 925 is to be written.

When performing the first matrix multiplication operation, control engine 120 is programmed to allocate extra space in output matrix 925 and reserves the extra space for the output generated by the matrix multiplication operation on first input matrix 905 and submatrix 920. This way, output generated by the two matrix multiplication suboperations are stored in the correctly in a contiguous block of memory. To program control engine 120 to allocate the correct amount of extra space in output 925 as well as allocate space in the correct locations in output 925, software application 105 sends a write parameter command to hardware system 110 that specifies the same configuration ID as the one used for the execute command for the first matrix multiplication suboperation, a parameter ID of the output row step parameter, and a value for the output row step parameter. The value of the output row step parameter indicates the number of memory addresses to increase the pointer to output matrix 925 when the end of a row is reached. In this example, the value for the output row step parameter is three. So when control engine 120 reaches the end of a row of output generated by the first matrix multiplication suboperation, control engine 120 adjusts the pointer to output matrix 925 by three. As a result, control engine 120 writes the output generated by the first matrix multiplication suboperation in the manner shown at the top of FIG. 9B.

The definitions (e.g., dimensions) of first input matrix 905 and submatrix 915 are stored in the same set of configuration registers used to execute the first matrix multiplication suboperation. Specifically, the dimensions of the first input matrix 905 are stored in the operand A row parameter and the operand A column parameter. The dimensions of the submatrix 915 are stored in the operand B row parameter and the operand B column parameter. To set up this set of configuration registers, software application 105 sends four write parameter commands to hardware system 110. The first write parameter specifies the same configuration ID as the one used for the execute command for the first matrix multiplication suboperation, a parameter ID of the operand A row parameter, and a value of four for the operand A row parameter. The second write parameter specifies the same configuration ID as the one used for the execute command for the first matrix multiplication suboperation, a parameter ID of the operand A column parameter, and a value of four for the operand A column parameter. The third write parameter specifies the same configuration ID as the one used for the execute command for the first matrix multiplication suboperation, a parameter ID of the operand B row parameter, and a value of four for the operand B row parameter. The fourth write parameter specifies the same configuration ID as the one used for the execute command for the first matrix multiplication suboperation, a parameter ID of the operand B column parameter, and a value of three for the operand B column parameter.

The execute command that software application 105 sends to hardware system 110 for the second suboperation includes a configuration ID of the set of configuration registers in configuration registers 125 to use for this command, an opcode indicating a matrix multiplication operation, the memory address in memory 135 from which first input matrix 905 is to be read, the memory address in memory 135 from which submatrix 920 is to be read, and the memory address in memory 135 to which output matrix 925 is to be written. For the second matrix multiplication suboperation, the memory address to which output matrix 925 is to be written is the address of the fourth element of output matrix 925. The set of configuration registers used for the second matrix multiplication suboperation is different than the set of configuration registers used for the first matrix multiplication suboperation.

When performing the second matrix multiplication operation, control engine 120 is programmed to write output data to the correct locations in output matrix 925. To program control engine 120 to write to the correct locations, software application 105 sends a write parameter command to hardware system 110 that specifies the same configuration ID as the one used for the execute command for the second matrix multiplication suboperation, a parameter ID of the output row step parameter, and a value of three for the output row step parameter. As described above, the value of the output row step parameter indicates the number of memory addresses to increase the pointer to output matrix 925 when the end of a row is reached. As such, when control engine 120 reaches the end of a row of output generated by the second matrix multiplication suboperation, control engine 120 adjusts the pointer to output matrix 925 by three. Accordingly, control engine 120 writes the output generated by the second matrix multiplication suboperation in the correct locations in output matrix 925, as depicted at the bottom of FIG. 9B.

The definitions (e.g., dimensions) of first input matrix 905 and submatrix 920 are stored in the same set of configuration registers used to execute the second matrix multiplication suboperation. These matrix definitions are stored in this set of configuration registers in the same manner described above. That is, software application 105 sends four write parameter commands to hardware system 110 that set the dimensions of first input matrix 905 and submatrix 920 in the set of configuration registers.

FIGS. 9A and 9B show an example of split matrix operations on two-dimensional (2D) matrices. One of ordinary skill in the art will recognize that the same or similar techniques may be applied for multidimensional matrices (e.g., 3D matrices). In addition, split matrix operations may be applied to matrix 905 instead of matrix 910 using the same or similar techniques illustrated in FIGS. 9A and 9B.

Figure 10:
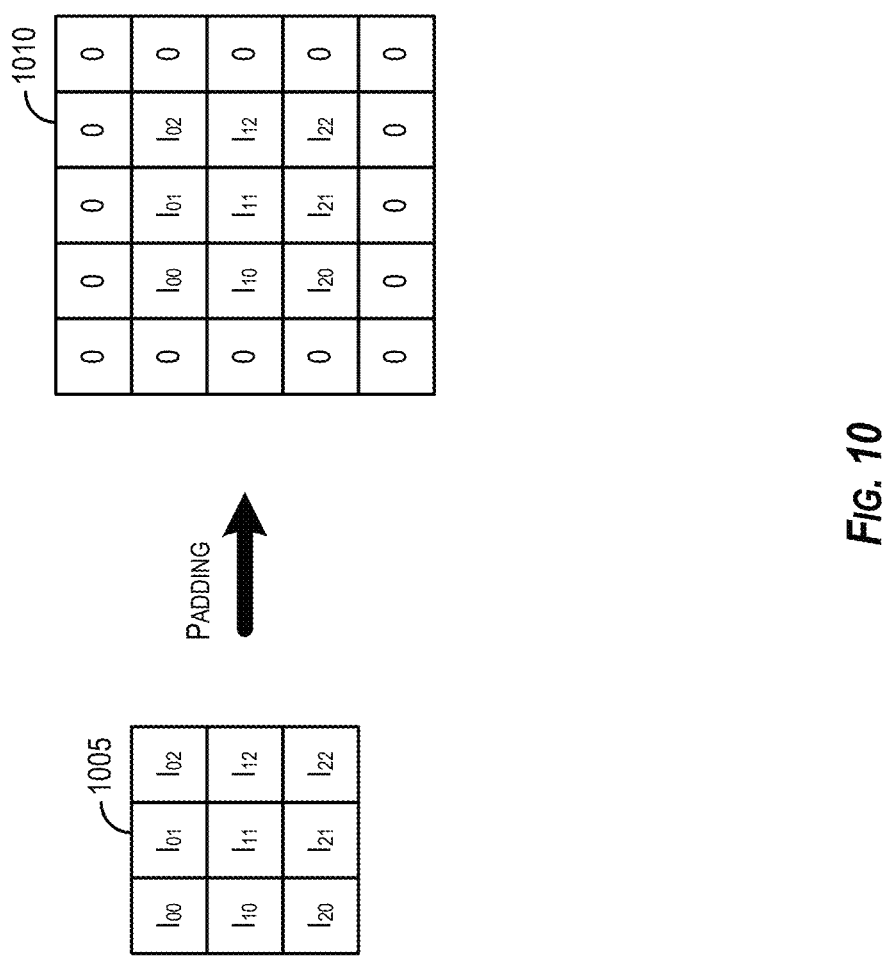
FIG. 10 illustrates an example of matrix padding according to some embodiments.

In addition to intelligently writing output data, programming control engine 120 can be programmed to optimize hardware resource utilization when performing convolution operations on matrices. FIG. 10 illustrates an example of matrix padding according to some embodiments. Specifically, FIG. 10 illustrates an example matrix 1005. Matrix 1005 is a two-dimensional (2D) matrix with a height of 3 (e.g., 3 rows) and a width of 3 (e.g., 3 columns). For this example, matrix 1005 is padded with a row of defined values (zeros in this example) above matrix 1005, a row of defined values below matrix 1005, a column of defined values to the left of matrix 1005, and a column of defined values to the right of matrix 1005. The padded matrix 1005 forms matrix 1010.

To optimize the usage of storage in memory 135, matrix 1010 is not stored in memory 135. Rather, the dimensions of matrix 1005 (3×3 in this example) are stored in the operand B row and the operand B column parameters of a set of configuration registers. In addition, the definition of the padded region in matrix 1010 is stored in the image left padding parameter, image right padding parameter, image top padding parameter, and image bottom padding parameter of the set of configuration parameters. This avoids having to store the defined values used for the padding in memory 135. Software application 105 may send write commands to hardware system 110 to set these parameter values in the set of configuration parameters.

Figure 11:
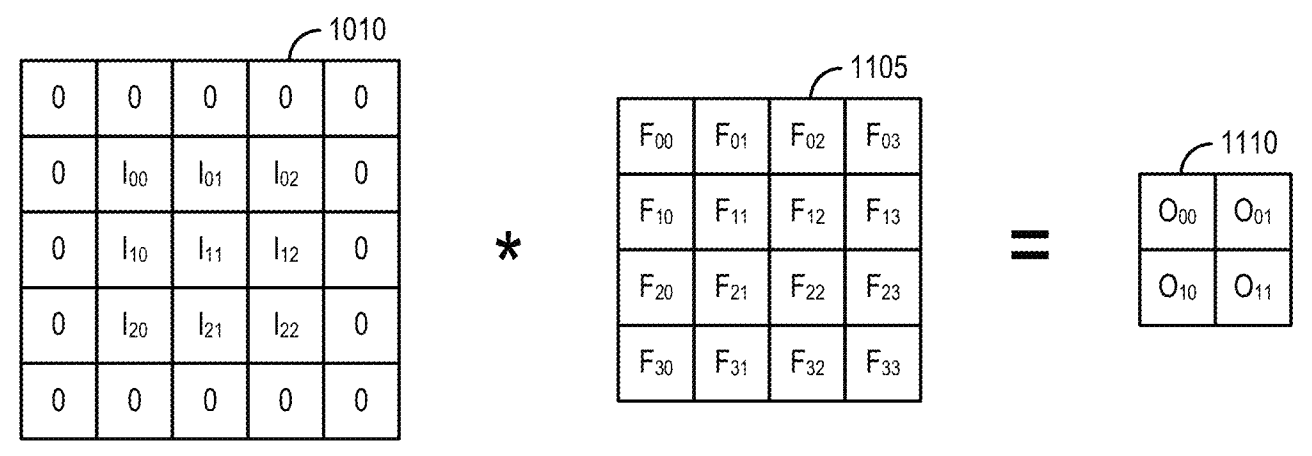

FIG. 11 illustrates an example matrix operation on a padded matrix according to some embodiments. In particular, FIG. 11 illustrates a convolution operation between matrix 1010 and matrix 1105. As shown, matrix 1105 is a 2D matrix with a height of 4 (e.g., 4 rows) and a width of 4 (e.g., 4 columns). The dimensions of matrix 1105 (4×4 in this example) are stored in the operand A row and the operand A column parameters of the set of configuration registers described above that includes the definition of matrix 1005 and the padded region in matrix 1010. These parameters may be set by software application 105 via write parameter commands.

To perform the convolution operation, software application 105 sends hardware system 110 an execute command that includes a configuration ID of the set of configuration registers in configuration registers 125 to use for this command (e.g., the set of configuration registers described above that includes the definition of matrix 1005, the padded region in matrix 1010, and matrix 1105), an opcode indicating a convolution operation, the memory address in memory 135 from which first input matrix 1005 is to be read, the memory address in memory 135 from which matrix 1105 is to be read, and the memory address in memory 135 to which output matrix 1110 is to be written. In response to receiving the command from command queue 115, control engine 120 retrieves parameter values from the set of configuration registers corresponding to the configuration ID and performs convolutions based on the matrices defined in the set of configuration registers. In some embodiments, control engine 120 performs a convolution in a similar manner as that described above by reference to FIGS. 4A-4I. That is, control engine 120 converts convolutions into sets of matrix multiplication operations and instructs MOU 130 to perform the matrix multiplication operations.

In some embodiments, control engine 120 has logic for determining whether an element in matrix 1010 belongs to the padded region of matrix 1010 based on the definition of matrix 1005 and the definition of the padded region stored in the respective parameters in the set of configuration registers. Control engine 120 skips multiplication operations in the convolutions that involve such elements thereby reducing usage of computing resources in hardware system 110 (e.g., MOU 130).

Figure 12:
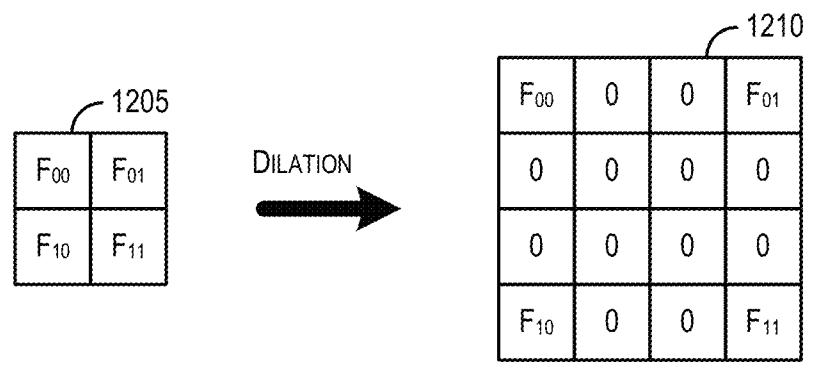

FIG. 12 illustrates an example of matrix dilation according to some embodiments. Specifically, FIG. 12 illustrates an example matrix 1205. Matrix 1205 is a two-dimensional (2D) matrix with a height of 2 (e.g., 2 rows) and a width of 2 (e.g., 2 columns). In this example, matrix 1205 is dilated so that two rows defined values (zeros in this example) are inserted between the first and second rows of matrix 1205 and two columns of defined values are inserted between the first and second columns of matrix 1205. The dilated matrix 1205 forms matrix 1210.

Utilization of memory 135 is optimized by not storing the matrix 1210 in memory 135. Instead, the dimensions of matrix 1205 (2×2 in this example) are stored in the operand A row and the operand A column parameters of a set of configuration registers. Also, the definition of the dilated region in matrix 1210 is stored in the operand A dilation row parameter and the operand A dilation column parameter of the set of configuration parameters. Storing the definition of the dilation region in this manner prevents having to store the defined values (e.g., zeros) used for the dilation region in memory 135. This reduces space used in memory 135 as well as bandwidth when reading data for matrix 1210 (e.g., only values for matrix 1205 need to be read). Software application 105 may send write commands to hardware system 110 to set these parameter values in the set of configuration parameters.

Figure 13:
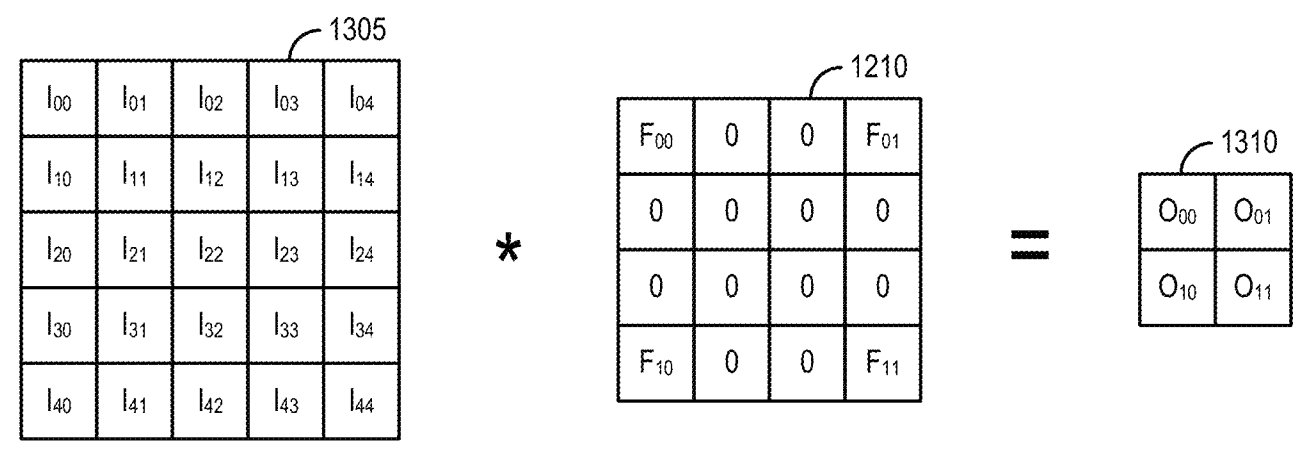

FIG. 13 illustrates an example matrix operation on a dilated matrix according to some embodiments. Specifically, FIG. 13 illustrates a convolution operation between matrix 1305 and matrix 1210. As depicted, matrix 1305 is a 2D matrix with a height of 5 (e.g., 5 rows) and a width of 5 (e.g., 5 columns). The dimensions of matrix 1305 (5×5 in this example) are stored in the operand B row and the operand B column parameters of the set of configuration registers described above that includes the definition of matrix 1205 and the dilated region in matrix 1210. These parameters may be set by software application 105 via write parameter commands.

To perform the convolution operation in this example, software application 105 sends hardware system 110 an execute command that includes a configuration ID of the set of configuration registers in configuration registers 125 to use for this command (e.g., the set of configuration registers described above that includes the definition of matrix 1205, the dilated region in matrix 1210, and matrix 1305), an opcode indicating a convolution operation, the memory address in memory 135 from which first input matrix 1205 is to be read, the memory address in memory 135 from which matrix 1305 is to be read, and the memory address in memory 135 to which output matrix 1310 is to be written. Upon receiving the command from command queue 115, control engine 120 retrieves parameter values from the set of configuration registers corresponding to the configuration ID and performs convolutions based on the matrices defined in the set of configuration registers. In some embodiments, control engine 120 performs a convolution in a similar manner as that described above by reference to FIGS. 4A-4I. That is, control engine 120 converts convolutions into sets of matrix multiplication operations and instructs MOU 130 to perform the matrix multiplication operations.

Similar to the padded region logic, control engine 120 may have logic for determining whether an element in matrix 1210 belongs to the dilated region of matrix 1210 based on the definition of matrix 1205 and the definition of the dilation region stored in the respective parameters in the set of configuration registers. Control engine 120 skips multiplication operations in the convolutions that involve such elements resulting in a reduction of the usage of computing resources in hardware system 110 (e.g., MOU 130).

FIGS. 12 and 13 show an example of dilating matrix 1210 and using it in a convolution operation (e.g., as a filter or kernel). One of ordinary skill in the art will understand that matrix 1305 can alternatively, or additionally, be dilated and used in a similar convolution operation (e.g., as an input image). Moreover, the example depicted in FIGS. 12 and 13 show a symmetrical dilation of a matrix.

Using the parameters mentioned above, control engine 120 can be configured to perform a variety of other operations. For instance, control engine 120 may be configured to perform matrix operations on matrices with asymmetrical dilations through the operand A dilation row parameter, the operand A dilation column parameter, the operand B dilation row parameter, and the operand B dilation column parameter mentioned above. As another example, control engine 120 can be configured to perform convolution operations with asymmetrical strides through the stride row parameter and the stride column parameter explained above. Additionally, control engine 120 may be configured to perform asymmetrical padding through the image left padding parameter, the image right padding parameter, the image top padding parameter, and the image bottom padding parameter described above. A combination of any number of these different aspects may be used in the same convolution operation. For example, in some cases, control engine 120 can be configured to perform a convolution operation using asymmetric strides, asymmetric padding, and/or asymmetric dilation.

Figure 14:
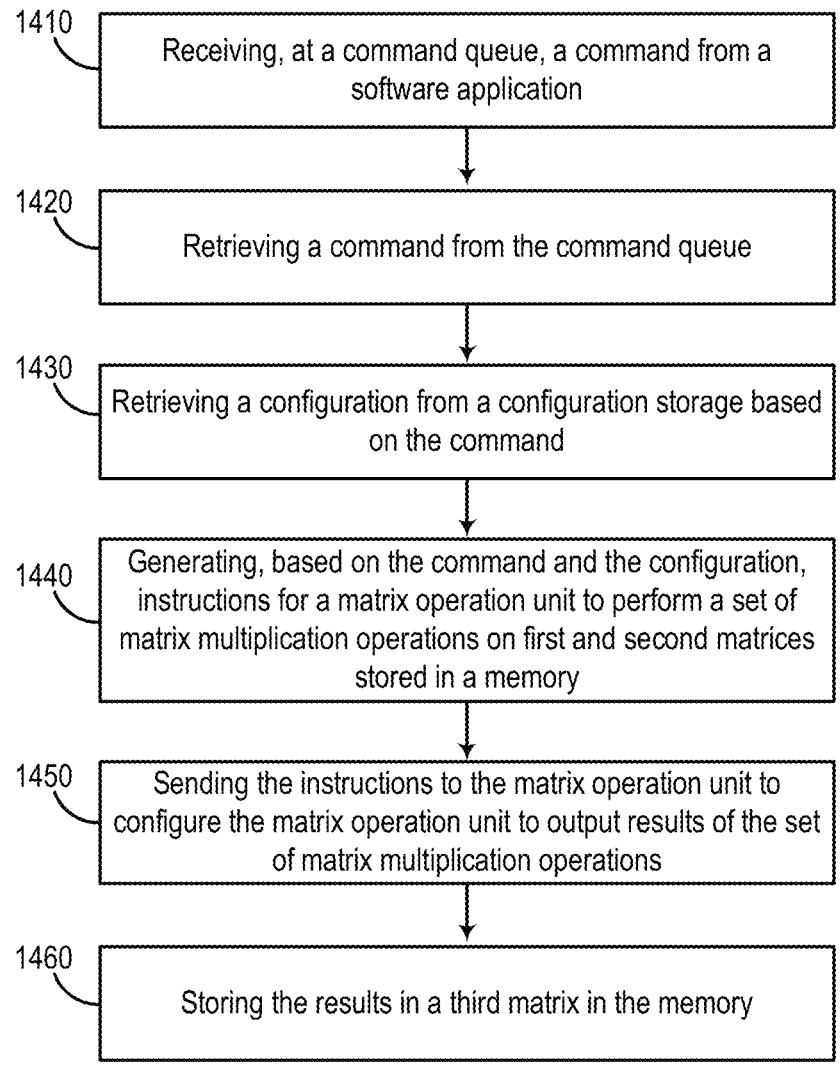
FIG. 14 illustrates a process for performing matrix operations using a programmable control engine according to some embodiments.

FIG. 14 illustrates a process 1400 for performing matrix operations using a programmable control engine according to some embodiments. In some embodiments, hardware system 110 performs process 1400. Process 1400 starts by receiving, at 1410, a command from a software application. Referring to FIG. 8 as an example, command queue 115 of hardware system 110 may receive the command from software application 105.

Next, process 1400 retrieves, at 1420, a command from a command queue. Referring to FIG. 8 as an example, control engine 120 can retrieve the command from command queue 115. Then, process 1400 retrieves, at 1430, a configuration from a configuration storage based on the command. The configuration storage is configured to store a plurality of configurations. Each configuration in the plurality of configurations includes a plurality of configuration parameters. Referring to FIG. 8 as an example, control engine 120 retrieves a set of configuration registers from configuration registers 125 based on a configuration ID include in the command.

At 1440, process 1400 generates, based on the command and the configuration, instructions for a matrix multiplication unit to perform a set of matrix multiplication operations on first and second matrices stored in a memory. Referring to FIG. 8 as an example, control engine 120 generates instructions for MOU 130 to perform a set of matrix multiplication operations on two matrices stored in memory 135.

Process 1400 then sends, at 1450, the instructions to the matrix multiplication unit to configure the matrix multiplication unit to output results of the set of matrix multiplication operations. Referring to FIG. 8 as an example, control engine 120 sends the instructions to MOU 130. Finally, process 1400 stores, at 1460, the results in a third matrix in the memory. Referring to FIG. 8 as an example, control engine 120 may receive the output results from MOU 130. Control engine 120 stores the results in a third matrix in memory 135.

Figure 15:
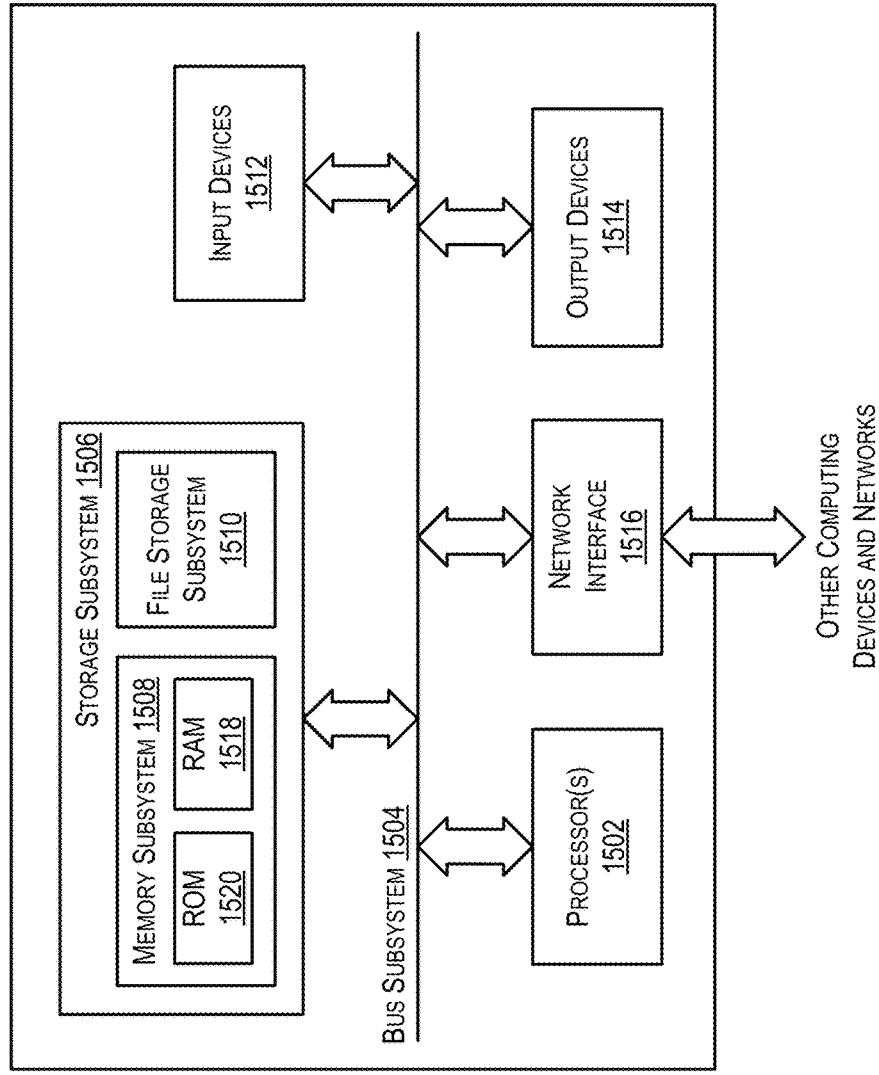
FIG. 15 depicts a simplified block diagram of an example computer system according to some embodiments.

The techniques describe above may be implemented in a wide range of computer systems configured to process neural networks. FIG. 15 depicts a simplified block diagram of an example computer system 1500, which can be used to implement the techniques described in the foregoing disclosure. In some embodiments, computer system 1500 may be used to implement system 100. For example, software application 105 may operate on computing system 1500. As shown in FIG. 15, computer system 1500 includes one or more processors 1502 that communicate with a number of peripheral devices via a bus subsystem 1504. These peripheral devices may include a storage subsystem 1506 (e.g., comprising a memory subsystem 1508 and a file storage subsystem 1510) and a network interface subsystem 1516. Some computer systems may further include user interface input devices 1512 and/or user interface output devices 1514.

Bus subsystem 1504 can provide a mechanism for letting the various components and subsystems of computer system 1500 communicate with each other as intended. Although bus subsystem 1504 is shown schematically as a single bus, alternative embodiments of the bus subsystem can utilize multiple busses.

Network interface subsystem 1516 can serve as an interface for communicating data between computer system 1500 and other computer systems or networks. Embodiments of network interface subsystem 1516 can include, e.g., Ethernet, a Wi-Fi and/or cellular adapter, a modem (telephone, satellite, cable, ISDN, etc.), digital subscriber line (DSL) units, and/or the like.

Storage subsystem 1506 includes a memory subsystem 1508 and a file/disk storage subsystem 1510. Subsystems 1508 and 1510 as well as other memories described herein are examples of non-transitory computer-readable storage media that can store executable program code and/or data that provide the functionality of embodiments of the present disclosure.

Memory subsystem 1508 includes a number of memories including a main random access memory (RAM) 1518 for storage of instructions and data during program execution and a read-only memory (ROM) 1520 in which fixed instructions are stored. File storage subsystem 1510 can provide persistent (e.g., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 1500 is illustrative and many other configurations having more or fewer components than system 1500 are possible.

Figure 16:
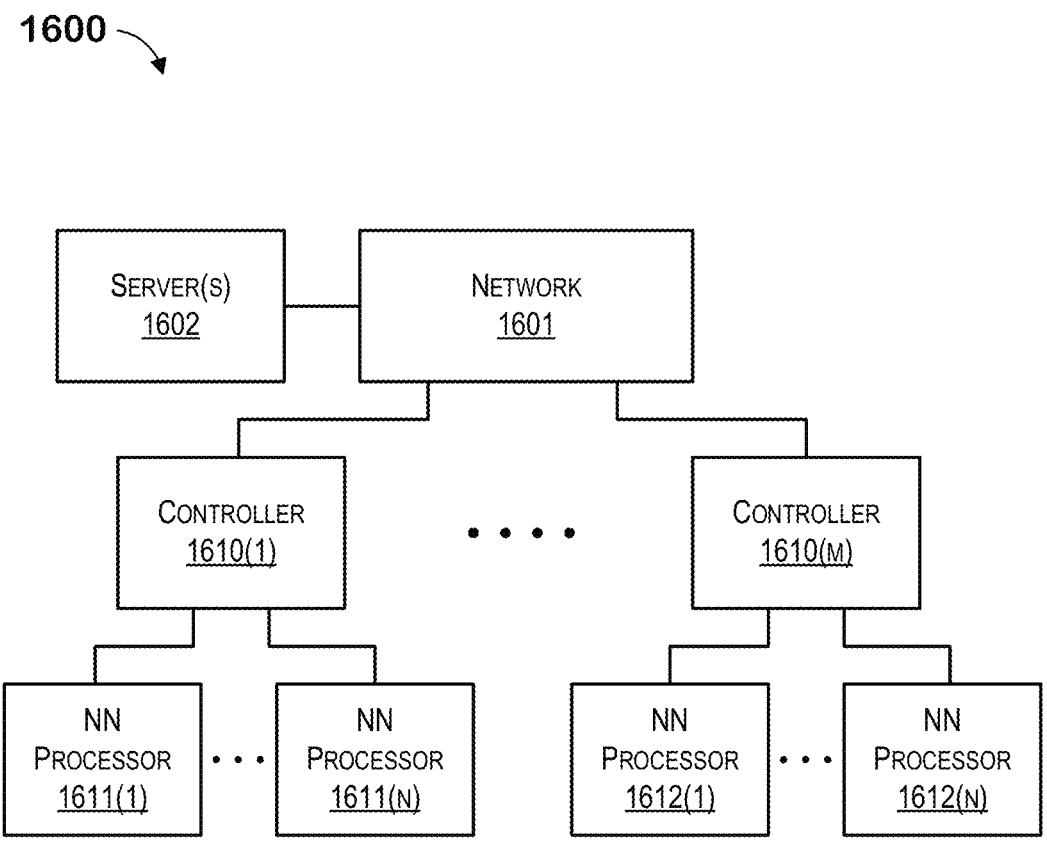
FIG. 16 illustrates a neural network processing system according to some embodiments.

FIG. 16 illustrates a neural network processing system according to some embodiments. In various embodiments, neural networks according to the present disclosure may be implemented and trained in a hardware environment comprising one or more neural network processors. A neural network processor may refer to various graphics processing units (GPU) (e.g., a GPU for processing neural networks produced by Nvidia Corp®), field programmable gate arrays (FPGA) (e.g., FPGAs for processing neural networks produced by Xilinx®), or a variety of application specific integrated circuits (ASICs) or neural network processors comprising hardware architectures optimized for neural network computations, for example. In this example environment, one or more servers 1602, which may comprise architectures illustrated in FIG. 15 above, may be coupled to a plurality of controllers 1610(1)-1610(M) over a communication network 1601 (e.g. switches, routers, etc.). Controllers 1610(1)-1610(M) may also comprise architectures illustrated in FIG. 15 above. Each controller 1610(1)-1610(M) may be coupled to one or more NN processors, such as processors 1611(1)-1611(N) and 1612(1)-1612(N), for example. NN processors 1611(1)-1611(N) and 1612(1)-1612(N) may include a variety of configurations of functional processing blocks and memory optimized for neural network processing, such as training or inference. The NN processors are optimized for neural network computations. In some embodiments, each NN processor can be implemented by hardware system 110. Server 1602 may configure controllers 1610 with NN models as well as input data to the models, which may be loaded and executed by NN processors 1611(1)-1611(N) and 1612(1)-1612(N) in parallel, for example. Models may include layers and associated weights as described above, for example. NN processors may load the models and apply the inputs to produce output results. NN processors may also implement training algorithms described herein, for example.

III. Further Example Embodiments

In various embodiments, the present disclosure includes systems, methods, and apparatuses for performing tensor operations using a programmable control engine. The techniques described herein may be embodied in non-transitory machine-readable medium storing a program executable by a computer system, the program comprising sets of instructions for performing the techniques described herein. In some embodiments, a system includes a set of processing units and a non-transitory machine-readable medium storing instructions that when executed by at least one processing unit in the set of processing units cause the at least one processing unit to perform the techniques described above. In some embodiments, the non-transitory machine-readable medium may be memory, for example, which may be coupled to one or more controllers or one or more artificial intelligence processors, for example.

The following techniques may be embodied alone or in different combinations and may further be embodied with other techniques described herein.

For example, in one embodiment, the present disclosure includes a system comprising a command queue configured to receive a command from a software application; a configuration storage configured to store a plurality of configurations, each configuration in the plurality of configurations comprising a plurality of configuration parameters; a matrix multiplication unit configured to perform matrix multiplication operations; memory configured to store matrices; and a control engine configured to retrieve the command from the command queue; retrieve a configuration from the configuration storage based on the command; generate, based on the command and the configuration, instructions for the matrix multiplication unit to perform a set of matrix multiplication operations on first and second matrices stored in the memory; and send the instructions to the matrix multiplication unit to configure the matrix multiplication unit to output results of the set of matrix multiplication operations; and store the results in a third matrix in the memory.

In one embodiment, the configuration comprises a set of memory offsets. The control engine uses the set of memory offsets to retrieve data from the first and second matrices or store the results in the third matrix.

In one embodiment, the instructions comprise a first set of instructions for the matrix multiplication unit to perform a first matrix multiplication operation in the set of matrix multiplication operations on the first matrix and a portion of the second matrix stored in the memory and output a first set of results of the first matrix multiplication operation. The control engine stores the first set of results in the third matrix in the memory by allocating space in the third matrix in the memory for a second set of results output by a second matrix multiplication operation in the set of matrix multiplication operations. The instructions further comprise a second set of instructions for the matrix multiplication unit to perform the second matrix multiplication operation on the first matrix and a remaining portion of the second matrix stored in the memory and output the second set of results of the second matrix multiplication operation, wherein the control engine is further configured to store the second set of results in the allocated space in the third matrix in the memory.

In one embodiment, the plurality of configuration parameters specified in the configuration comprises an image left padding parameter, an image right padding parameter, an image top padding parameter, and an image bottom padding parameter. The set of matrix multiplication operations comprises a set of convolution operations on the first and second matrices stored in memory. The control engine is further configured to, at each convolution operation in the set of convolution operations, determine whether a padded region exists based on a set of values specified for a set of the image left padding parameter, the image right padding parameter, the image top padding parameter, and the image bottom padding parameter; and, upon determining that the padded region exists, skip the convolution operation.

In one embodiment, the set of values comprises two values that are different.

In one embodiment, the plurality of configuration parameters specified in the configuration comprises a first operand dilation row parameter, a first operand dilation column parameter, a second operand dilation row parameter, and a second operand dilation column parameter. The set of matrix multiplication operations comprises a set of convolution operations on the first and second matrices stored in memory. The control engine is further configured to, at each convolution operation in the set of convolution operations, determine whether a dilated region exists based on a set of values specified for a set of the image left padding parameter, the image right padding parameter, the image top padding parameter, and the image bottom padding parameter; and, upon determining that the dilated region exists, skip the convolution operation.

In one embodiment, the set of values comprises two values that are different.

In one embodiment, the plurality of configuration parameters specified in the configuration comprises a stride row parameter and a stride column parameter. The set of matrix multiplication operations comprises a set of convolution operations on the first and second matrices stored in memory. The control engine is further configured to, at each convolution operation in the set of convolution operations shift the second matrix relative to the first matrix based on a set of values specified for a set of the stride row parameter and the stride column parameter.

In one embodiment, the set of values comprises two values that are different.

In one embodiment, the command is a first command and the configuration is a first configuration. The command queue is further configured to receive a second command from the software application. The control engine is further configured to retrieve the second command from the command queue. The second command comprises a configuration identifier (ID), a parameter ID, and a value. The control engine is further configured to identify a second configuration in the configuration storage based on the configuration ID and store the value for a parameter that correspond to the parameter ID in the second configuration.

In one embodiment, the instructions are first instructions. The command queue is further configured to receive a third command from the software application. The control engine is further configured to retrieve the third command from the command queue; retrieve the second configuration from the configuration storage based on the third command; generate, based on the third command, second instructions for the matrix operation unit to perform a set of matrix multiplication operations on fourth and fifth matrices stored in the memory and output results of the set of matrix multiplication operations in a sixth matrix stored in the memory; and send the second instructions to the matrix operation unit.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A system comprising:
   a command queue configured to receive a command from a software application;
   a configuration storage configured to store a plurality of configurations, each configuration in the plurality of configurations comprising a plurality of configuration parameters;
   a matrix operation unit circuit configured to perform matrix multiplication operations;
   memory configured to store matrices; and
   a control engine configured to:
      retrieve the command from the command queue;
      retrieve a configuration from the configuration storage based on the command;
      generate, based on the command and the configuration, instructions for the matrix operation unit circuit to perform a set of matrix multiplication operations on first and second matrices stored in the memory;
      send the instructions to the matrix operation unit circuit to configure the matrix operation unit circuit to output results of the set of matrix multiplication operations; and
      store the results in a third matrix in the memory.

2. The system of claim 1, wherein the configuration comprises a set of memory offsets, wherein the control engine uses the set of memory offsets to retrieve data from the first and second matrices or store the results in the third matrix.

3. The system of claim 1, wherein the instructions comprise a first set of instructions for the matrix operation unit circuit to perform a first matrix multiplication operation in the set of matrix multiplication operations on the first matrix and a portion of the second matrix stored in the memory and output a first set of results of the first matrix multiplication operation, wherein the control engine stores the first set of results in the third matrix in the memory by allocating space in the third matrix in the memory for a second set of results output by a second matrix multiplication operation in the set of matrix multiplication operations,
   wherein the instructions further comprise a second set of instructions for the matrix operation unit circuit to perform the second matrix multiplication operation on the first matrix and a remaining portion of the second matrix stored in the memory and output the second set of results of the second matrix multiplication operation, wherein the control engine is further configured to store the second set of results in the allocated space in the third matrix in the memory.

4. The system of claim 1, wherein the plurality of configuration parameters specified in the configuration comprises an image left padding parameter, an image right padding parameter, an image top padding parameter, and an image bottom padding parameter, wherein the set of matrix multiplication operations comprises a set of convolution operations on the first and second matrices stored in the memory, wherein the control engine is further configured to, at each convolution operation in the set of convolution operations:
   determine whether a padded region exists based on a set of values specified for a set of the image left padding parameter, the image right padding parameter, the image top padding parameter, and the image bottom padding parameter; and
   upon determining that the padded region exists, skip the convolution operation.

5. The system of claim 4, wherein the set of values comprises two values that are different.

6. The system of claim 1, wherein the plurality of configuration parameters specified in the configuration comprises a first operand row parameter, a first operand column parameter, a second operand row parameter, a second operand column parameter, a second operand dilation row parameter, and a second operand dilation column parameter, wherein the set of matrix multiplication operations comprises a set of convolution operations on the first and second matrices stored in the memory, wherein the control engine is further configured to, at each convolution operation in the set of convolution operations:
   determine whether a dilated region exists based on a set of values specified for a set of the second operand row parameter, the second operand column parameter, the second operand dilation row parameter, and the second operand dilation column parameter; and upon determining that the dilated region exists, skip the convolution operation.

7. The system of claim 6, wherein the set of values comprises two values that are different.

8. The system of claim 1, wherein the plurality of configuration parameters specified in the configuration comprises a stride row parameter and a stride column parameter, wherein the set of matrix multiplication operations comprises a set of convolution operations on the first and second matrices stored in the memory, wherein the control engine is further configured to, at each convolution operation in the set of convolution operations, shift the second matrix relative to the first matrix based on a set of values specified for a set of the stride row parameter and the stride column parameter.

9. The system of claim 8, wherein the set of values comprises two values that are different.

10. The system of claim 1, wherein the command is a first command, wherein the configuration is a first configuration, wherein the command queue is further configured to receive a second command from the software application, wherein the control engine is further configured to retrieve the second command from the command queue, the second command comprising a configuration identifier (ID), a parameter ID, and a value, wherein the control engine is further configured to identify a second configuration in the configuration storage based on the configuration ID and store the value for a parameter that correspond to the parameter ID in the second configuration.

11. The system of claim 10, wherein the set of matrix multiplication operations is a first set of matrix multiplication operations, wherein the instructions are first instructions, wherein the command queue is further configured to receive a third command from the software application, wherein the control engine is further configured to:

retrieve the third command from the command queue;

retrieve the second configuration from the configuration storage based on the third command;

generate, based on the third command, second instructions for the matrix operation unit circuit to perform a second set of matrix multiplication operations on fourth and fifth matrices stored in the memory and output results of the second set of matrix multiplication operations in a sixth matrix stored in the memory; and send the second instructions to the matrix operation unit circuit.

12. A method comprising:

receiving, at a command queue, a command from a software application;

retrieving, by a control engine, the command from the command queue;

retrieving, by the control engine, a configuration from a configuration storage based on the command, the configuration storage configured to store a plurality of configurations, each configuration in the plurality of configurations comprising a plurality of configuration parameters;

generating, by the control engine, based on the command and the configuration, instructions for a matrix operation unit circuit to perform a set of matrix multiplication operations on first and second matrices stored in a memory;

sending, by the control engine, the instructions to the matrix operation unit circuit to configure the matrix operation unit circuit to output results of the set of matrix multiplication operations; and storing, by the control engine, the results in a third matrix in the memory.

13. The method of claim 12, wherein the configuration comprises a set of memory offsets, the method further comprising using the set of memory offsets to retrieve data from the first and second matrices or store the results in the third matrix.

14. The method of claim 12, wherein the instructions comprise a first set of instructions for the matrix operation unit circuit to perform a first matrix multiplication operation in the set of matrix multiplication operations on the first matrix and a portion of the second matrix stored in the memory and output a first set of results of the first matrix multiplication operation, the method further comprising storing the first set of results in the third matrix in the memory by allocating space in the third matrix in the memory for a second set of results output by a second matrix multiplication operation in the set of matrix multiplication operations, wherein the instructions further comprise a second set of instructions for the matrix operation unit circuit to perform the second matrix multiplication operation on the first matrix and a remaining portion of the second matrix stored in the memory and output the second set of results of the second matrix multiplication operation, the method further comprising storing the second set of results in the allocated space in the third matrix in the memory.

15. The method of claim 12, wherein the plurality of configuration parameters specified in the configuration comprises an image left padding parameter, an image right padding parameter, an image top padding parameter, and an image bottom padding parameter, wherein the set of matrix multiplication operations comprises a set of convolution operations on the first and second matrices stored in the memory, wherein the method further comprises, at each convolution operation in the set of convolution operations:

determining whether a padded region exists based on a set of values specified for a set of the image left padding parameter, the image right padding parameter, the image top padding parameter, and the image bottom padding parameter; and upon determining that the padded region exists, skipping the convolution operation.

16. The method of claim 12, wherein the plurality of configuration parameters specified in the configuration comprises a first operand row parameter, a first operand column parameter, a second operand row parameter, a second operand column parameter, a second operand dilation row parameter, and a second operand dilation column parameter, wherein the set of matrix multiplication operations comprises a set of convolution operations on the first and second matrices stored in the memory, wherein the method further comprises, at each convolution operation in the set of convolution operations:

determining whether a dilated region exists based on a set of values specified for a set of the second operand row parameter, the second operand column parameter, the second operand dilation row parameter, and the second operand dilation column parameter, and upon determining that the dilated region exists, skipping the convolution operation.

17. The method of claim 12, wherein the plurality of configuration parameters specified in the configuration comprises a stride row parameter and a stride column parameter, wherein the set of matrix multiplication operations comprises a set of convolution operations on the first and second matrices stored in the memory, wherein the method further comprises, at each convolution operation in the set of convolution operations, shifting the second matrix relative to the first matrix based on a set of values specified for a set of the stride row parameter and the stride column parameter.

18. A circuit comprising:
 a first circuit configured to receive a command from a software application;
 a second circuit configured to store a plurality of configurations, each configuration in the plurality of configurations comprising a plurality of configuration parameters;
 a third circuit configured to perform matrix multiplication operations;
 a fourth circuit configured to store matrices; and
 a fifth circuit configured to:
  retrieve the command from the first circuit;
  retrieve a configuration from the second circuit based on the command;
  generate, based on the command and the configuration, instructions for the third circuit to perform a set of matrix multiplication operations on first and second matrices stored in the fourth circuit;
  send the instructions to the third circuit to configure the third circuit to output results of the set of matrix multiplication operations; and
  store the results in a third matrix in the fourth circuit.

19. The circuit of claim 18, wherein the command is a first command, wherein the configuration is a first configuration, wherein the first circuit is further configured to receive a second command from the software application, wherein the fifth circuit is further configured to retrieve the second command from the first circuit, the second command comprising a configuration identifier (ID), a parameter ID, and a value, wherein the fifth circuit is further configured to identify a second configuration in the second circuit based on the configuration ID and store the value for a parameter that correspond to the parameter ID in the second configuration.

20. The circuit of claim 19, wherein the set of matrix multiplication operations is a first set of matrix multiplication operations, wherein the instructions are first instructions, wherein the first circuit is further configured to receive a third command from the software application, wherein the fifth circuit is further configured to:
 retrieve the third command from the first circuit;
 retrieve the second configuration from the second circuit based on the third command;
 generate, based on the third command, second instructions for the third circuit to perform a second set of matrix multiplication operations on fourth and fifth matrices stored in the fourth circuit and output results of the second set of matrix multiplication operations in a sixth matrix stored in the fourth circuit; and
 send the second instructions to the third circuit.

* * * * *